United States Patent
Takeda et al.

(10) Patent No.: US 12,063,170 B2
(45) Date of Patent: Aug. 13, 2024

(54) CROSS-CARRIER SCHEDULING

(71) Applicant: QUALCOMM Incorporated, San Diego, CA (US)

(72) Inventors: Kazuki Takeda, Tokyo (JP); Alberto Rico Alvarino, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 338 days.

(21) Appl. No.: 17/654,390

(22) Filed: Mar. 10, 2022

(65) Prior Publication Data

US 2022/0321288 A1    Oct. 6, 2022

Related U.S. Application Data

(60) Provisional application No. 63/169,486, filed on Apr. 1, 2021.

(51) Int. Cl.
*H04L 5/00* (2006.01)
*H04W 48/12* (2009.01)
*H04W 72/23* (2023.01)

(52) U.S. Cl.
CPC ........... *H04L 5/0032* (2013.01); *H04W 48/12* (2013.01); *H04W 72/23* (2023.01)

(58) Field of Classification Search
CPC ...... H04L 5/0032; H04W 48/12; H04W 72/23
See application file for complete search history.

(56) References Cited

U.S. PATENT DOCUMENTS

| 10,448,389 | B1* | 10/2019 | Seo | H04L 5/0053 |
| 2021/0385826 | A1 | 12/2021 | Moon et al. | |
| 2024/0014926 | A1* | 1/2024 | Li | H04L 1/0046 |

FOREIGN PATENT DOCUMENTS

| WO | 2019216599 A1 | 11/2019 |
| WO | 2021016046 A1 | 1/2021 |

OTHER PUBLICATIONS

International Search Report and Written Opinion—PCT/US2022/020043—ISA/EPO—Jul. 13, 2022.

(Continued)

*Primary Examiner* — Kevin Kim
(74) *Attorney, Agent, or Firm* — QUALCOMM Incorporated

(57) ABSTRACT

A base station may configure a first threshold indicating maximum numbers of blind decodes (BDs) and non-overlapping control channel elements (CCEs) for physical downlink control channel (PDCCH) candidates on a primary cell (PCell)/primary secondary cell (PSCell), and transmit, for a user equipment (UE), a configuration for PDCCH candidates in common search spaces (CSSs) or user-specific search spaces (USSs) on the PCell/PSCell and USSs on a secondary cell (SCell) for PDCCH scheduling data for the PCell/PSCell. The base station may transmit at least one PDCCH in PDCCH candidates. The UE may receive the configuration and receive the PDCCH by blindly decoding the PDCCH candidates in in at least one of the CSSs or the USSs configured on the PCell/PSCell and the USSs configured on the Scell. The USSs configured on the PCell/PSCell may support PDCCH overbooking.

30 Claims, 14 Drawing Sheets

(56) References Cited

OTHER PUBLICATIONS

NTT Docomo: "Offline Summary for PDCCH Structure and Search Space", 3GPP Draft, 3GPP TSG RAN WG1 Meeting #94, R1-1809855, Summary AI 7.1.3.1 R7, 3rd Generation Partnership Project—(3GPP). Mobile Competence Centre ; 658. Route Des Lucioles ; F-86921 Sophia-Antipolis Cedex ; France, vol. RAN WG1. No. Gothenburg, Sweden, Aug. 20, 2018-Aug. 24, 2018, Aug. 23, 2018 (Aug. 23, 2018), XP051517212, 70 Pages, p. 6. line 2-line 4.

* cited by examiner

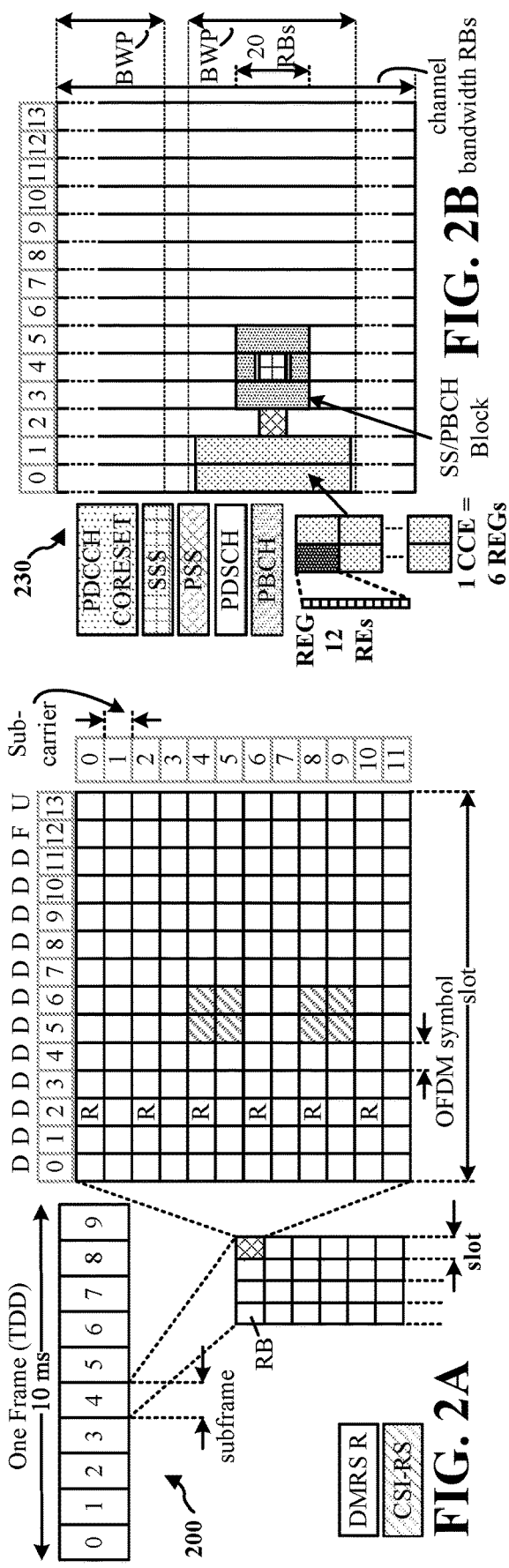
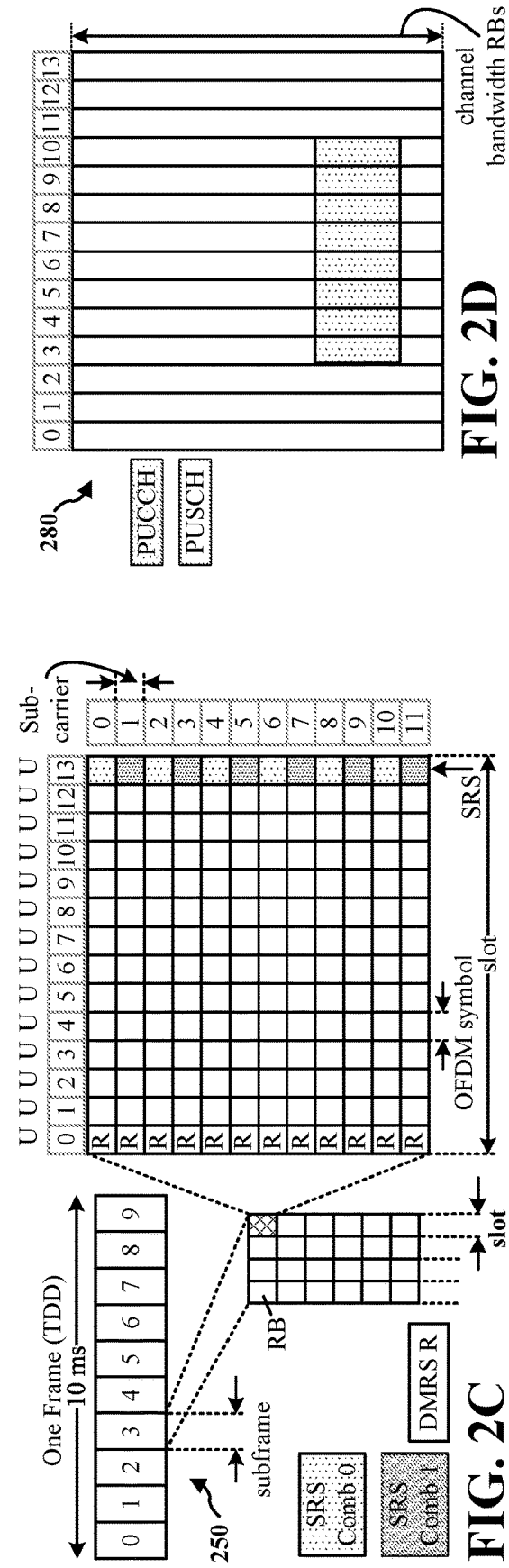

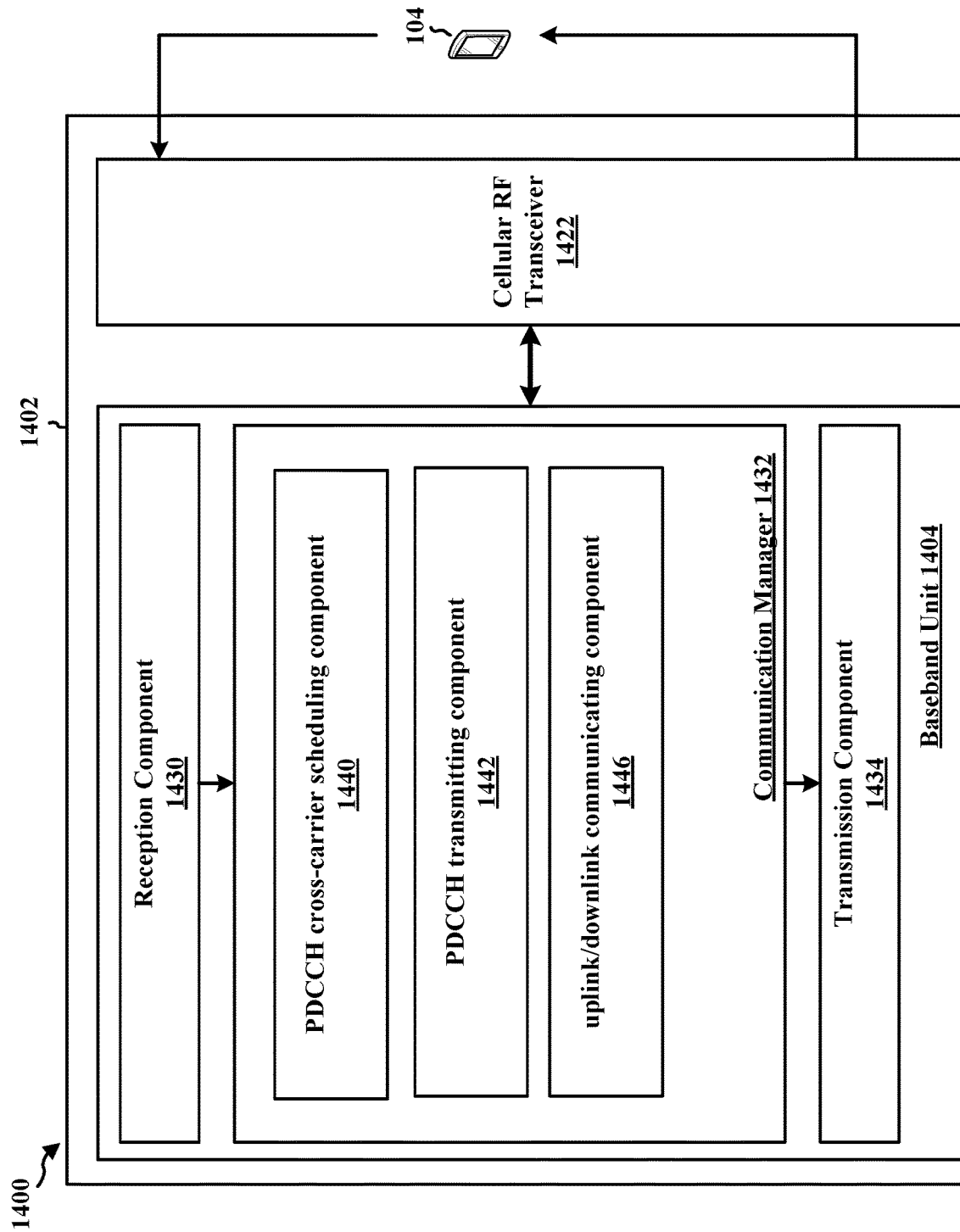

CROSS-CARRIER SCHEDULING

CROSS REFERENCE TO RELATED APPLICATION(S)

This application claims the benefit of and priority to U.S. Provisional Application Ser. No. 63/169,486, entitled "METHOD AND APPARATUS FOR CROSS-CARRIER SCHEDULING" and filed on Apr. 1, 2021, which is expressly incorporated by reference herein in its entirety.

TECHNICAL FIELD

The present disclosure relates generally to communication systems, and more particularly, to a method of wireless communication with a cross-carrier scheduling.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a base station and a user equipment (UE). The base station may configure a first threshold indicating a first maximum number of blind decodes (BDs) and a second threshold indicating a second maximum number of non-overlapping control channel elements (CCEs) for physical downlink control channel (PDCCH) candidates on a first cell, transmit, to the UE, a configuration for one or more PDCCH candidates in one or more common search spaces (CSSs) configured on the first cell and one or more user-specific search spaces (USSs) configured on a second cell for PDCCH including scheduling data for the first cell, the first cell including at least one of a primary cell (PCell) or a primary secondary cell (PSCell), and the second cell including a secondary cell (SCell), and transmit, to the UE, at least one PDCCH in one or more PDCCH candidates in at least one of one or more CSSs or one or more USSs configured on the first cell and the one or more USSs configured on the second cell for PDCCH including scheduling of the first cell based on the configuration and within a scheduled cell limit including a total number of BDs and non-overlapping CCEs for the PDCCH candidates.

The UE may receive, from the base station, the configuration for one or more PDCCH candidates in one or more CSSs configured on the first cell and one or more USSs configured on the second cell for PDCCH including scheduling data for the first cell, and perform blind decoding of the one or more PDCCH candidates in at least one of the one or more CSSs or one or more USSs on the first cell and the one or more USSs on the second cell based on the configuration and within a scheduled cell limit including a total number of BDs and non-overlapping CCEs for PDCCH candidates.

In some aspects, the UE may report, to the base station, a parameter indicating PDCCH blind decoding capabilities supported by the UE for CA, and the base station may set the scheduled cell limit less than or equal to the PDCCH blind decoding capabilities supported by the UE indicated by the parameter. In one aspect, the scheduled cell limit may be based on a smaller or the same SCS associated with the first cell or the second cell. In another aspect, the scheduled cell limit has a value less than or equal to a CA limit of the first cell and the second cell.

The UE may receive the PDCCH in one or more of the PDCCH candidates, and receive a physical downlink shared channel (PDSCH) from the base station or transmitting a physical uplink shared channel (PUSCH) to the base station on the first cell based on the PDCCH. The UE may perform blind decoding of the one or more CSSs on the first cell and the one or more USSs on the first cell within the first threshold and the second threshold.

In some aspects, the first threshold indicating a first maximum number of BDs and a second threshold indicating a second maximum number of non-overlapping CCEs for the CSSs on the first cell may be based on a slot having a highest number of BDs and non-overlapping CCEs for the CSSs, a third maximum number of BDs for the USSs on the second cell may be based on the scheduled cell limit minus the first threshold, and a fourth maximum number of non-overlapping CCEs for the USSs on the second cell may be based on the scheduled cell limit minus the second threshold.

In one aspect, the configuration may further include the one or more PDCCH candidates in one or more USSs configured on the first cell, and where the method further including receiving, from the base station, an indication of a first threshold indicating a first maximum number of BDs and a second threshold indicating a second maximum number of non-overlapping CCEs for the PDCCH candidates on the first cell. The base station may transmit the first threshold and the second threshold via an RRC message.

In some aspect, a third threshold for a third maximum number BDs and a fourth threshold for a fourth maximum number of non-overlapping CCEs for the CSSs on the first cell may be based on a slot having a highest number of BDs and non-overlapping CCEs for the CSSs, and the first threshold may have a value greater than or equal to the third threshold and the second threshold has a value greater than or equal to the fourth threshold.

In one aspect, the base station may schedule at least one USS of the first USSs configured on the first cell beyond the first threshold or the second threshold and within the first threshold and the second threshold of the first cell. The UE may determine that at least one USS of the first USSs configured on the first cell is scheduled beyond the first threshold or the second threshold of the first cell, and determine not to monitor the PDCCH candidates for the at least one USS of the first USSs scheduled beyond the first threshold or the second threshold.

In some aspect, the UE may transmit an indication of support for the one or more USSs on the first cell, and the base station may receive the indication of the support for the one or more USSs on the first cell. The configuration for the one or more USSs on the first cell may be based on the UE supporting the one or more USSs on the first cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 14 is a diagram illustrating an example of a hardware implementation for an example apparatus.

DETAILED DESCRIPTION

Figure 1:
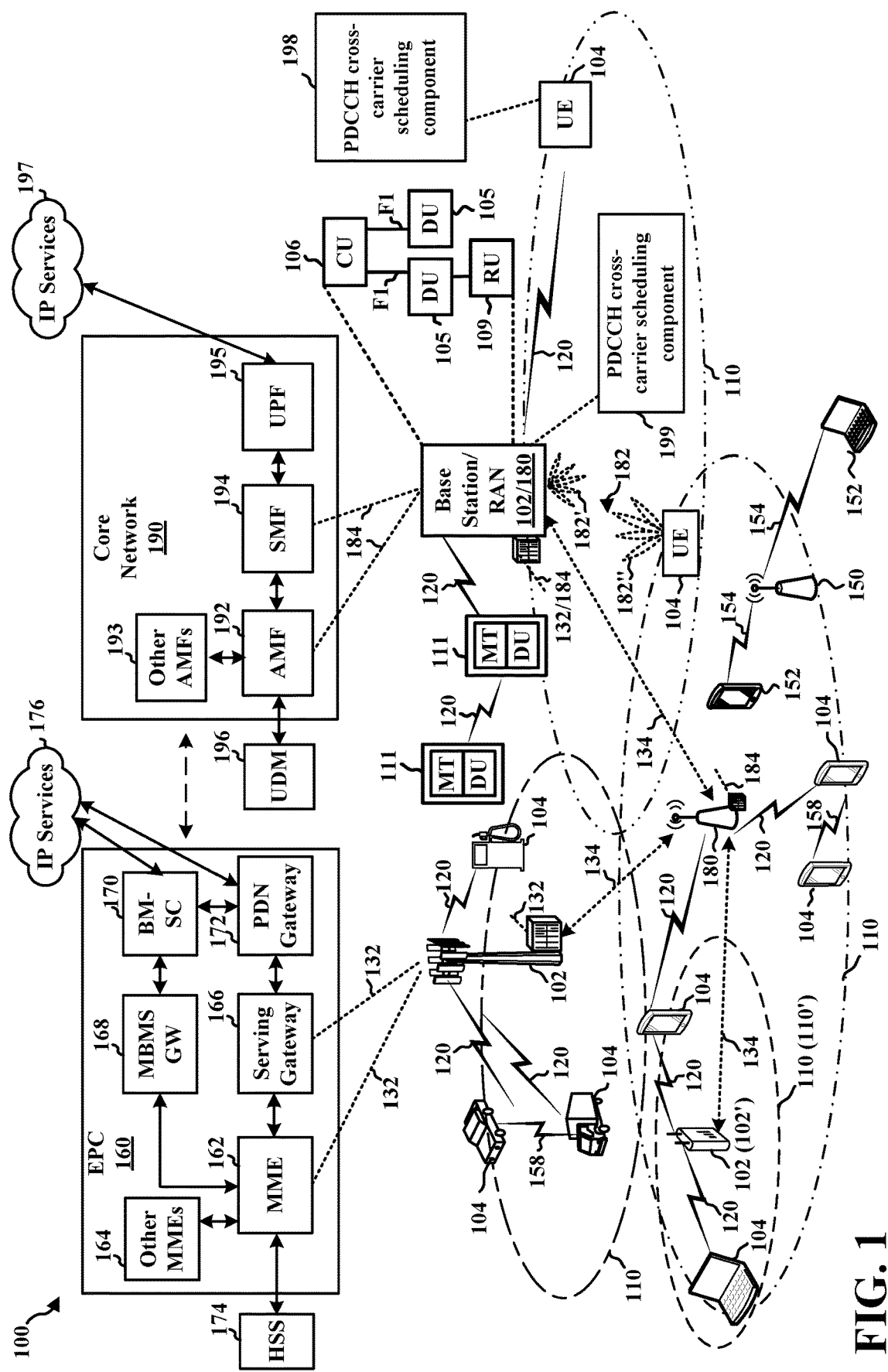
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a PDCCH cross-carrier scheduling component 198 configured to receive, from a base station, a configuration for one or more PDCCH candidates in one or more CSSs configured on a first cell and one or more USSs configured on a second cell for PDCCH including scheduling data for the first cell, the first cell including at least one of a PCell or a PSCell, and the second cell including an SCell and perform blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. In certain aspects, the base station 180 may include a PDCCH cross-carrier scheduling component 199 configured to configure a first threshold indicating a first maximum number of BDs and a second threshold indicating a second maximum number of non-overlapping CCEs for PDCCH candidates on a first cell, transmit, to a UE, a configuration for one or more PDCCH candidates in one or more CSSs configured on the first cell and one or more USSs configured on a second cell for PDCCH including scheduling data for the first cell, the first cell including at least one of a PCell or a PSCell, and the second cell including an SCell, and transmit, to the UE, at least one PDCCH in one or more PDCCH candidates in at least one of one or more CSSs or one or more USSs configured on the first cell and the one or more USSs configured on the second cell for PDCCH including scheduling of the first cell based on the configuration and within the scheduled cell limit including the first total number of BDs and the second total number of non-overlapping CCEs for the PDCCH candidates. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
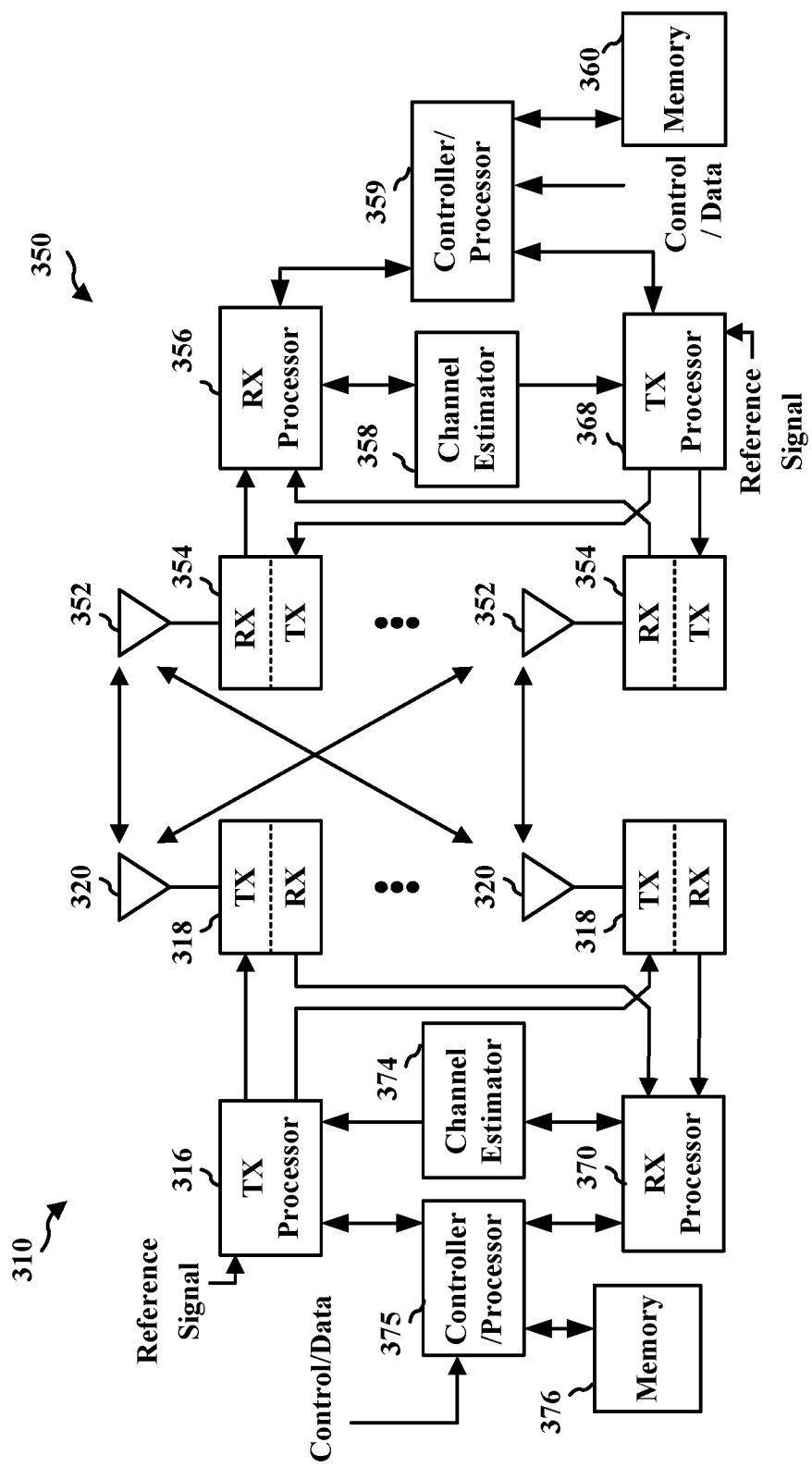
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

A UE may receive PDCCH carrying DCI from a network including a base station. scheduling uplink and/or downlink transmissions for the UE. For example, the PDCCH may schedule PUSCH transmissions from the UE, PDSCH transmissions to the UE, etc. As the UE may be located at a cell edge, the PDCCH may be transmitted by the base station with a higher transmission power than the traffic channels. The PDCCH transmission with the higher transmission power may cause interference including the inter-cell interference on the PDCCH. If the network and the UE support a carrier aggregation (CA), the network and the UE may enable cross-carrier scheduling for a UE connected to a PCell and an SCell. The UE may receive the PDCCH on a different carrier than the PUSCH/PDSCH is scheduled by the PDCCH. Accordingly, the network and the UE may reduce the inter-cell interference from transmitting the PDCCH at increased transmission power by transmitting the PDCCH to the UE via the different carrier.

The network and the UE may support a dual connectivity, and the UE may be connected to a primary node and a secondary node to communicate with the network. The primary node may provide the control plane connection to the network, and the secondary node may provide additional resources without the control plane connection to the network. The UE may be connected to a master cell group (MCG) including a group of serving cells associated with a primary node, and the MCG may include the PCell and one or more SCells. The UE may be connected to a secondary cell group (SCG) including a group of serving cells associated with the secondary node, and the SCG may include a primary secondary cell (PSCell) and one or more SCells.

In one aspect, the PDSCH or the PUSCH on the SCell may be cross-carrier scheduled from PDCCH on the PCell or the PSCell (PCell/PSCell). That is, the UE may receive the PDCCH on the PCell/PSCell that schedules the PDSCH or the PUSCH on the SCell. The PDSCH or the PUSCH on the PCell/PSCell may be cross-carrier scheduled from PDCCH on an SCell. That is, the UE may receive the PDCCH on the SCell that schedules the PDSCH or the PUSCH on the PCell/PSCell. In one aspect, the UE may be connected to one PCell and one or more SCells, and the network may configure one SCell of the one or more SCells as the SCell to carry the PDCCH for cross-carrier scheduling to PCell. In another aspect, UE with the DC may be connected to one PSCell and one or more SCells on the SCG, and the network may configure one SCell of the one or more SCells as the SCell to carry the PDCCH for cross-carrier scheduling to PSCell.

When the cross-carrier scheduling from SCell to the PCell/PSCell is configured, the UE may be configured to monitor the PDCCH candidates on the SCell for the PDCCH including DCI formats 0_1, 1_1, 0_2, or 1_2, which may schedule at least one of PDSCH or PUSCH on the PCell/PSCell. The UE may monitor PDCCH candidates in one or more of common search spaces (CSSs) or one or more of user-specific search spaces (USSs) on the PCell/PSCell, or one or more of USSs on the SCell to receive the PDCCH. The one or more CSSs may be referred to as one or more CSS sets, and the one or more USSs may be referred to as one or more USS sets. The UE may monitor one or more CSS sets on the PCell/PSCell for the 'DCI formats 0_0 and 1_0 that schedule PDSCH/PUSCH on PCell/PSCell.'

In one aspect, the UE may support monitoring PDCCH candidates in the one or more USS sets on the SCell to receive the PDCCH scheduling the PDSCH or the PUSCH on the PCell/PSCell. In another aspect, the UE may support monitoring PDCCH candidates in the one or more USS sets on the SCell and/or in the one or more USS sets on the PCell/PSCell.

Figure 4:
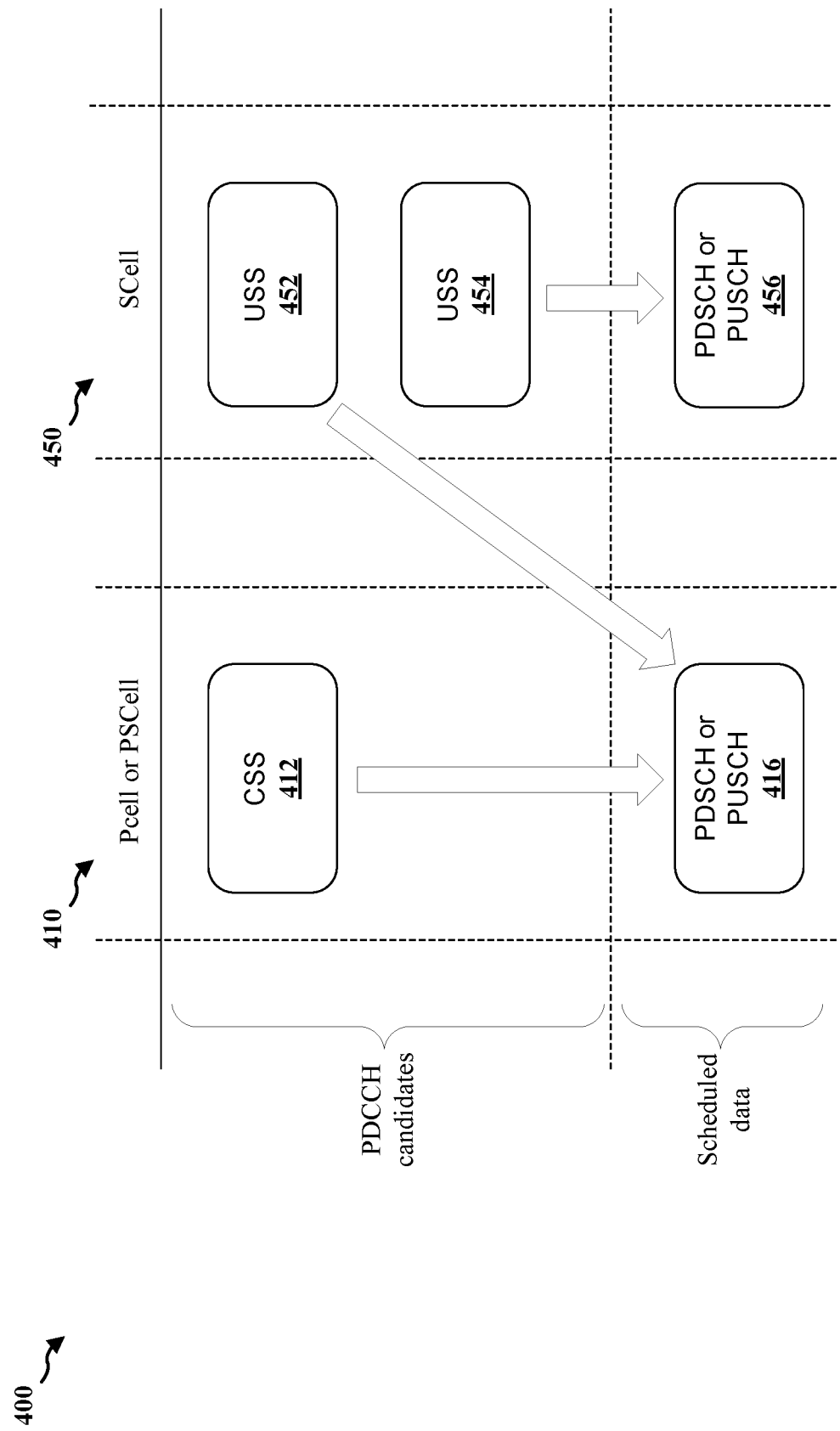
FIG. 4 is an example configuration of cross-carrier scheduling for a method of wireless communication.

FIG. 4 is an example configuration 400 of cross-carrier scheduling for a method of wireless communication. The example configuration 400 may include a PCell/PSCell 410 and an SCell 450. According to the example configuration 400, the UE may support PDCCH candidates in the one or more USS sets on the SCell to receive the PDCCH scheduling the PDSCH or the PUSCH on the PCell/PSCell.

The base station may transmit, to the UE, the PDCCH for scheduling the PDSCH or PUSCH on PCell/PSCell (PCell/PSCell PDSCH/PUSCH 416) in a PDCCH candidate in the one or more CSSs on the PCell/PSCell (PCell/PSCell CSSs 412) and in the one or more USSs on the SCell (first SCell USSs 452). The base station may also transmit, to the UE, a PDCCH for scheduling the PDSCH or PUSCH on SCell (SCell PDSCH/PUSCH 456) in the PDCCH candidates in the one or more USSs on the SCell (second SCell USS 454).

The UE may receive a configuration for monitoring one or more PDCCH candidates in one or more PCell/PSCell CSSs 412 and one or more first SCell USSs 452 for the PDCCH in order to receive the scheduling data for the PCell/PSCell. The UE may monitor the PDCCH candidates based on the configuration for one or more PCell/PSCell CSSs 412 and the one or more first SCell USSs 452. The monitoring may include attempting to perform blind decoding of a PDCCH candidate in order to receive the PDCCH scheduling the PCell/PSCell PDSCH/PUSCH 416.

The one or more PCell/PSCell CSSs 412 and the one or more first SCell USSs 452 may not support overbooking PDCCH candidates. That is, the UE that may support the PDCCH candidates in the one or more USS sets on the SCell up to a threshold limit. The UE may not be configured with PDCCH overbooking that trigger the UE to check if there is more than a threshold number of blind decodings or to monitor more than a threshold number of non-overlapping control channel elements (CCEs). Accordingly, the network including the base station may configure the search space sets, e.g., the CSSs and the USSs, for the UE so that the number of blind decodes (BDs) and non-overlapping CCEs of PDCCH candidates for scheduling the PDSCH/PUSCH on the PCell/PSCell within a slot, or other time period that may be referred to as a PDCCH monitoring span, do not exceed particular values. That is, the network may configure or identify a first threshold indicating a first maximum number of BDs and a second threshold indicating a second maximum number of non-overlapping CCEs for scheduling the PDSCH/PUSCH on the PCell/PSCell for the UE. The base station may then configure the one or more PCell/PSCell CSSs 412 to not exceed the first threshold and the second threshold for scheduling the PDSCH/PUSCH on the PCell/PSCell.

In some aspects, a scheduled cell limit may indicate a first total number of BDs and a second total number of non-overlapping CCEs for the PDCCH candidates. Based on the scheduled cell limit and the first threshold and the second threshold, the base station may configure a third maximum number of BDs and a fourth maximum number of non-overlapping CCEs of the PDCCH candidates in the SCell USSs 452 for scheduling the PDSCH/PUSCH on the PCell/PSCell. In some aspects, the third maximum number of BDs of the PDCCH candidates for the SCell USSs 452 scheduling the PDSCH/PUSCH on the PCell/PSCell may be based on the scheduled cell limit of BDs minus the first threshold, and the fourth maximum number of non-overlapping CCEs of the PDCCH candidates for the SCell USSs 452 scheduling the PDSCH/PUSCH on the PCell/PSCell may be based on the scheduled cell limit of non-overlapping CCEs minus the second threshold.

Figure 5:
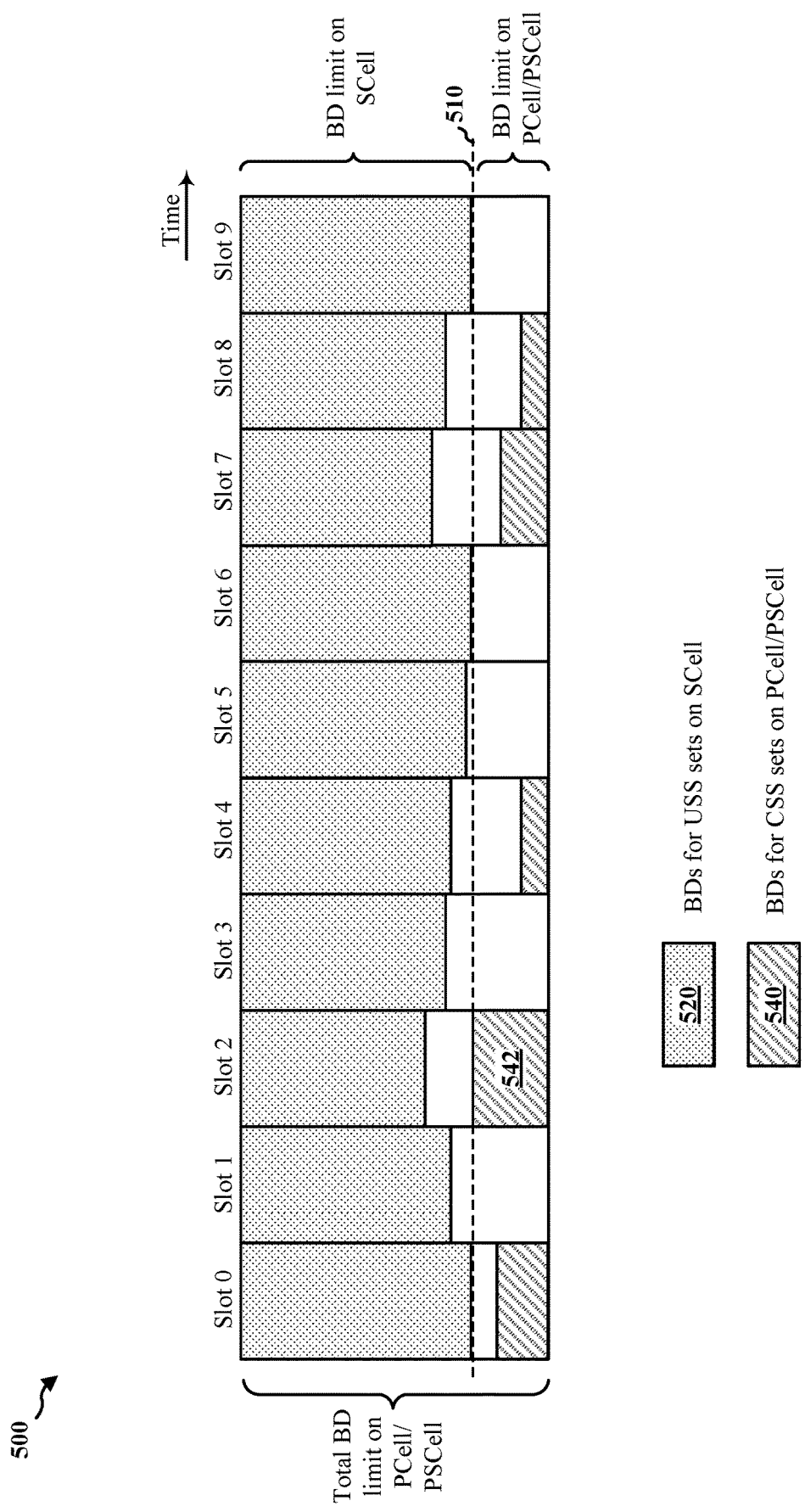
FIG. 5 is an example of BDs across time slots of cross-carrier scheduling for a method of wireless communication.

FIG. 5 is an example 500 of BDs across time slots for cross-carrier scheduling of a UE including a threshold level of BDs/non-overlapping CCEs. The example 500 may indicate the BDs for USS sets on SCell 520 that are for scheduling PDSCH/PUSCH on the PCell/PSCell and the BDs for CSS sets on PCell/PSCell 540. The example 500 of BDs may be associated with the UE that may support the reception of PDCCH in a PDCCH candidate of one or more of the USS sets on the SCell that schedules the PDSCH or the PUSCH on the PCell/PSCell. Here, the example 500 indicates the BDs, but the current disclosure is not limited thereto, and the example 500 may indicate a threshold for the non-overlapping CCEs within a slot. Also, the example 500 indicates that BDs are provided based on slots, but the current disclosure is not limited thereto, and the example 500 may be provided per PDCCH monitoring span that has a different size than a slot.

In some aspects, the network may reserve a minimum number of PDCCH candidates for the CSS set(s) on the PCell/PSCell, i.e., one or more PCell/PSCell CSSs 412. The maximum available numbers of BDs and non-overlapping CCEs for PDCCH candidates for USS set(s) on the SCell, i.e., the one or more first SCell USSs 452, scheduling PDSCH/PUSCH on the PCell/PSCell can be determined based on the reserved number. In some aspects, the base station may configure a first maximum number of BDs for PDCCH candidates for the CSS sets of the PCell/PSCell and/or may configure a second maximum number of non-overlapping CCEs for the PDCCH candidates for the CSS sets of the PCell/PSCell. In some aspects, the network may configure a third maximum number of BDs and/or a fourth maximum number of non-overlapping CCEs for the USSs on the SCell may be based on the first threshold and the second threshold. For example, the third maximum number of BDs for the USSs on the SCell may be based on the scheduled cell limit of BDs minus the first threshold, and the fourth maximum number of non-overlapping CCEs for the USSs on the SCell may be based on the scheduled cell limit of non-overlapping CCEs minus the second threshold. The scheduled cell limit may indicate a first total number of BDs and a second total number of non-overlapping CCEs for the PDCCH candidates.

Referring to the example 500, the first threshold 510 indicating the maximum number of BDs for the CSSs on the PCell/PSCell may be determined based on a slot having the highest number of BDs among all the slots. That is, the example 500 provides that slot 2 has the highest number of BDs among the ten slots from slot 0 to slot 9, and this may be the first threshold 510 as the number of BDs on PCell/PSCell 542.

Accordingly, the number of BDs available for PDCCH candidates on the SCell may be determined as the maximum number of BDs of the scheduled cell limit minus the first threshold indicating the maximum number of BDs on the PCell/PSCell across all the slots. In the example 500, the maximum number of BDs on the PCell/PSCell across the slots is the number of the BDs 542 on the PCell/PSCell on slot number 2. The network may configure the one or more USSs on the SCell, so that PDCCH overbooking is not provided.

The total numbers of the BDs and the non-overlapping CCEs allocated for the PDCCH candidates for scheduling PCell/PSCell may not exceed the per-cell limits (or the scheduled cell limits). That is, the total number of the BDs and the total number of the non-overlapping CCEs allocated for the PDCCH candidates on the PCell/PSCell and the SCell for each slot may not exceed the scheduled cell limits.

For example, this may be expressed as scheduled cell limit for BD≥BD number on PCell/PSCell+BD number on SCell, and the scheduled cell limit for CCE≥CCE number on PCell/PSCell+BD number on SCell. For example, in FIG. 5, the scheduling cell limit for BD for PCell/PSCell=BD number on PCell/PSCell at slot #2. The scheduling cell limit for CCE for PCell/PSCell=CCE number on PCell/PSCell at slot #2. The scheduling cell limit for BD for SCell≥scheduled cell limit for BD—scheduling cell limit for BD for PCell/PSCell. The scheduling cell limit for CCE for SCell≥scheduled cell limit for CCE—scheduling cell limit for CCE for PCell/PSCell. The scheduled cell limits may indicate a first maximum number of the BDs for PDCCH candidates and a second maximum number of the non-overlapping CCEs for PDCCH candidates, and the total number of the BDs allocated for the PDCCH candidate may not exceed the first maximum number of the BDs for the PDCCH candidates, and the total number of the non-overlapping CCEs allocated for the PDCCH candidates may not exceed the second maximum number of the non-overlapping CCEs for the PDCCH candidates.

In one aspect, different subcarrier spacings (SCSs) may be used for PDCCH candidates on the PCell/PSCell and on the SCell, and the network may use the lower SCS between the two SCSs is used as a reference SCS for determining the scheduled cell limits. That is, the PCell/PSCell may have a first SCS, and the SCell may have a second SCS, and when the first SCS is greater than the second SCS, the network may use the second SCS of the SCell to determine the scheduled cell limits. When the second SCS of the SCell is greater than the first SCS of the PCell/PSCell, the network may use the first SCS of the PCell/PSCell to determine the scheduled cell limits. In another aspect, the same SCS may be used for PDCCH candidates on the PCell/PSCell and on the SCell, and the network may use the same SCS associated with the PCell/PSCell and the SCell for determining the scheduled cell limits.

In another aspect, the UE may report the PDCCH blind decoding capabilities supported by the UE for CA to the network. For example, the UE may signal a parameter, e.g., pdcch-BlindDetectionCA, indicating the PDCCH blind decoding capabilities supported by the UE for CA to the base station. The UE may provide the indication in UE capability signaling in an RRC message, in some aspects. The network including the base station may determine the scheduled cell limits based on the smaller of the single-cell limits and the CA limits. The CA limits may be derived based on the number of DL cells for CA, the reported UE capability, e.g., pdcch-BlindDetectionCA, and the reference SCS, e.g., 15 kHz.

In one aspect, the maximum numbers of the BDs and the non-overlapping CCEs for the PDCCH candidates for scheduling PCell/PSCell may be determined as the value on the slot where these values are highest within a time frame, such as a group of slots. In some aspects, the network may configure the first threshold 510 as the first maximum number of BDs on the PCell/PSCell 542. In case the example 500 indicates the non-overlapping CCEs for the PDCCH candidates for scheduling PCell/PSCell, the network may configure the first threshold 510 as the number of the non-overlapping CCEs on the PCell/PSCell 542.

The maximum numbers of BDs and non-overlapping CCEs for PDCCH candidates for scheduling PCell/PSCell monitored on SCell may be determined by the scheduled cell limits minus the first threshold indicating the first maximum number of BDs and the second threshold indicating the second maximum number of the non-overlapping CCEs for PDCCH candidates for scheduling PCell/PSCell.

Figure 6:
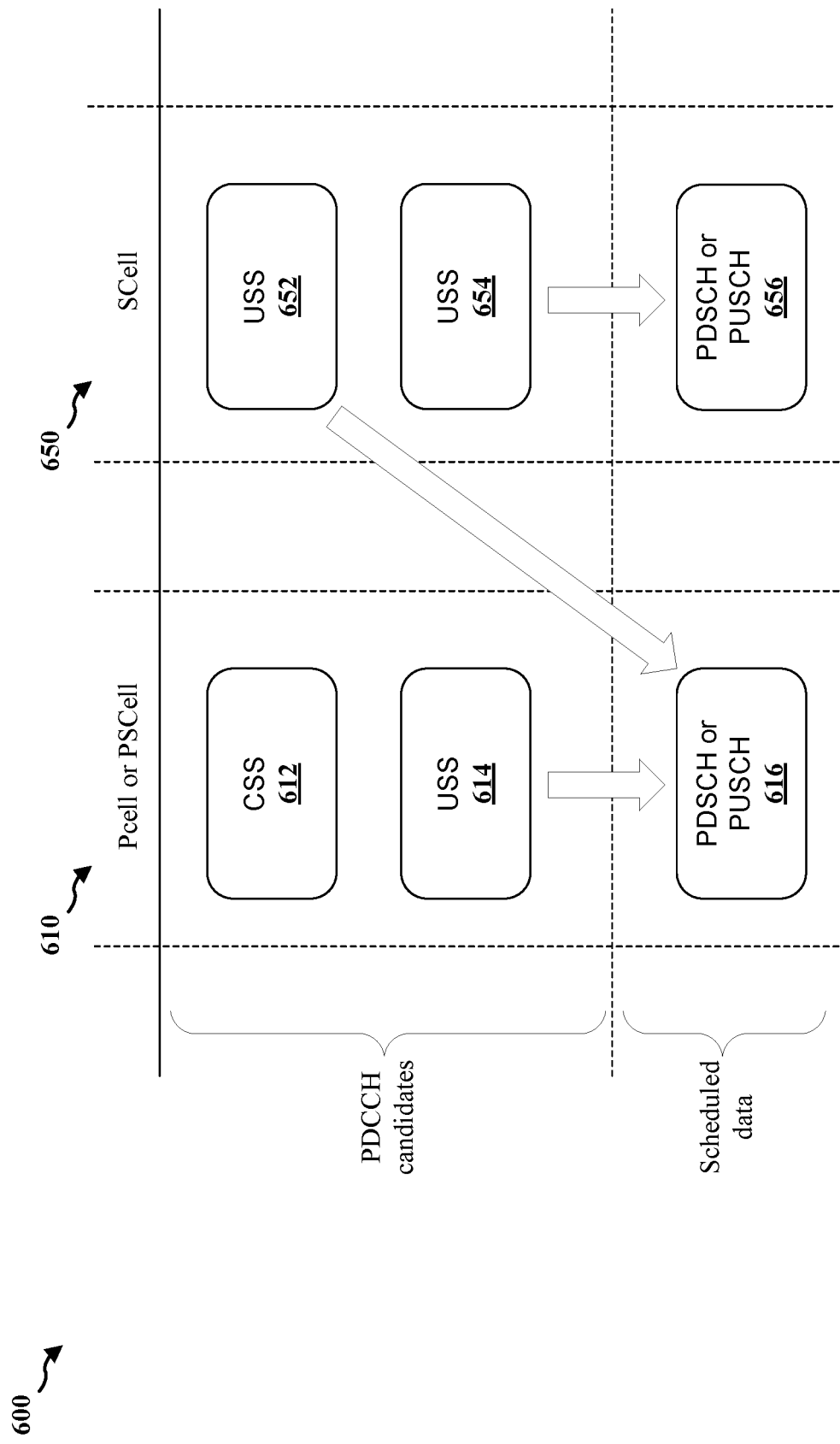
FIG. 6 is an example configuration of cross-carrier scheduling for a method of wireless communication.

FIG. 6 is an example configuration 600 of cross-carrier scheduling for a method of wireless communication. The example configuration 600 may include a PCell or PSCell 610 and an SCell 650. According to the example configuration 400, the UE may support monitoring PDCCH candidates in the one or more USS sets on the SCell and in the one or more USS sets on the PCell/PSCell.

The base station may transmit, to the UE, the PDCCH for scheduling the PDSCH or PUSCH on PCell/PSCell (PCell/PSCell PDSCH/PUSCH 616) in the PDCCH candidates in the one or more CSSs on the PCell/PSCell (PCell/PSCell CSSs 612), the PDCCH candidates in the one or more USSs on the PCell/PSCell (PCell/PSCell USSs 614), and in the one or more USSs on the SCell (first SCell USSs 652). The base station may also transmit, to the UE, the PDCCH for scheduling the PDSCH or PUSCH on SCell (SCell PDSCH/PUSCH 656) in the PDCCH candidates in the one or more USSs on the SCell (second SCell USS 654).

The UE may receive a configuration for one or more PDCCH candidates in one or more PCell/PSCell CSSs 612, one or more PCell/PSCell USSs 614, and one or more first SCell USSs 652 for the PDCCH including scheduling data for the first cell. Based on the configuration(s), the UE may monitor the one or more PCell/PSCell CSSs 612, the one or more PCell/PSCell USSs 614, and the one or more first SCell USSs 652 to receive the PDCCH scheduling the PCell/PSCell PDSCH/PUSCH 616. As a part of monitoring, the UE may monitor non-overlapping CCEs based on the CSS set(s) and USS set(s) and may attempt to perform blind decoding of PDCCH candidates based on the CSS set(s) and the USS set(s).

The one or more PCell/PSCell USSs 614 may support overbooking of the PDCCH candidates of one or more types of search space sets. In some aspects, the UE may support overbooking of the PDCCH candidates in the one or more USS sets on the PCell/PSCell may be configured with PDCCH overbooking. As used herein, "overbooking" refers to slots, or time spans, in which the BDs or non-overlapping CCEs exceeds a corresponding threshold. In some aspects, the base station may avoid overbooking the UE by not configuring/scheduling the UE in a way that exceeds the threshold(s) for a slot or a monitoring span. In some aspects, the UE may check the number of BDs and non-overlapping CCEs in a slot, or in a PDCCH monitoring span, and if the number(s) exceeds a corresponding threshold, the UE may determine not to monitor PDCCH candidates for one or more USS sets. For example, the CSS sets in a slot may not be overbooked beyond a CSS set threshold (e.g., such as threshold 710 in FIG. 7). If the UE determines in a particular slot that the BDs for the USS sets exceed the threshold 710, the UE may skip monitoring one or more USS set. Similarly, if the UE determines in a particular slot that the number of non-overlapping CCEs for the CSS sets exceed the threshold 710, the UE may skip monitoring one or more CSS set. The base station may avoid configuring the UE with CSS sets that exceed the threshold 710. Similar to the CSS, the USS on the SCell may have a scheduling limit based on a threshold (e.g., such as threshold 712 in FIG. 7). In contrast, the USS sets on the SCell may extend beyond the threshold 710, in a slot or time span, which may be referred to as overbooking. In some aspects, the network may configure the USS sets on both the PCell/PSCell and the SCell, and the network may clarify whether and/or how to perform the PDCCH overbooking for the one or more PCell/PSCell USSs 614. The network may implement the PDCCH overbooking for the PCell/PSCell using a higher-layer configuration. That is, the network including the base station may determine a higher-layer configuration indicating the threshold values for a first maximum number of BDs and a second threshold indicating a second maximum number of non-overlapping CCEs for the PDCCH candidates on the PCell/PSCell, and the base station may transmit the higher-layer configuration to the UE. The UE may monitor the PDCCH candidates based on the higher-layer configuration received from the base station. As the determination of the first threshold and the second threshold are based on a higher-layer configuration, the PDCCH overbooking for the PCell/PSCell regardless of the number of BDs and the number of CCEs allocated for the SCell, the actual numbers of BDs and non-overlapping CCEs on one cell of the PCell/PSCell and the SCell may be influenced by the PDCCH monitoring on the other cell of the PCell/PSCell and the SCell. The monitoring of the PDCCH candidates may be performed per slot or per span. The multiple scheduling cells may use different SCSs or the same SCS.

Figure 7:
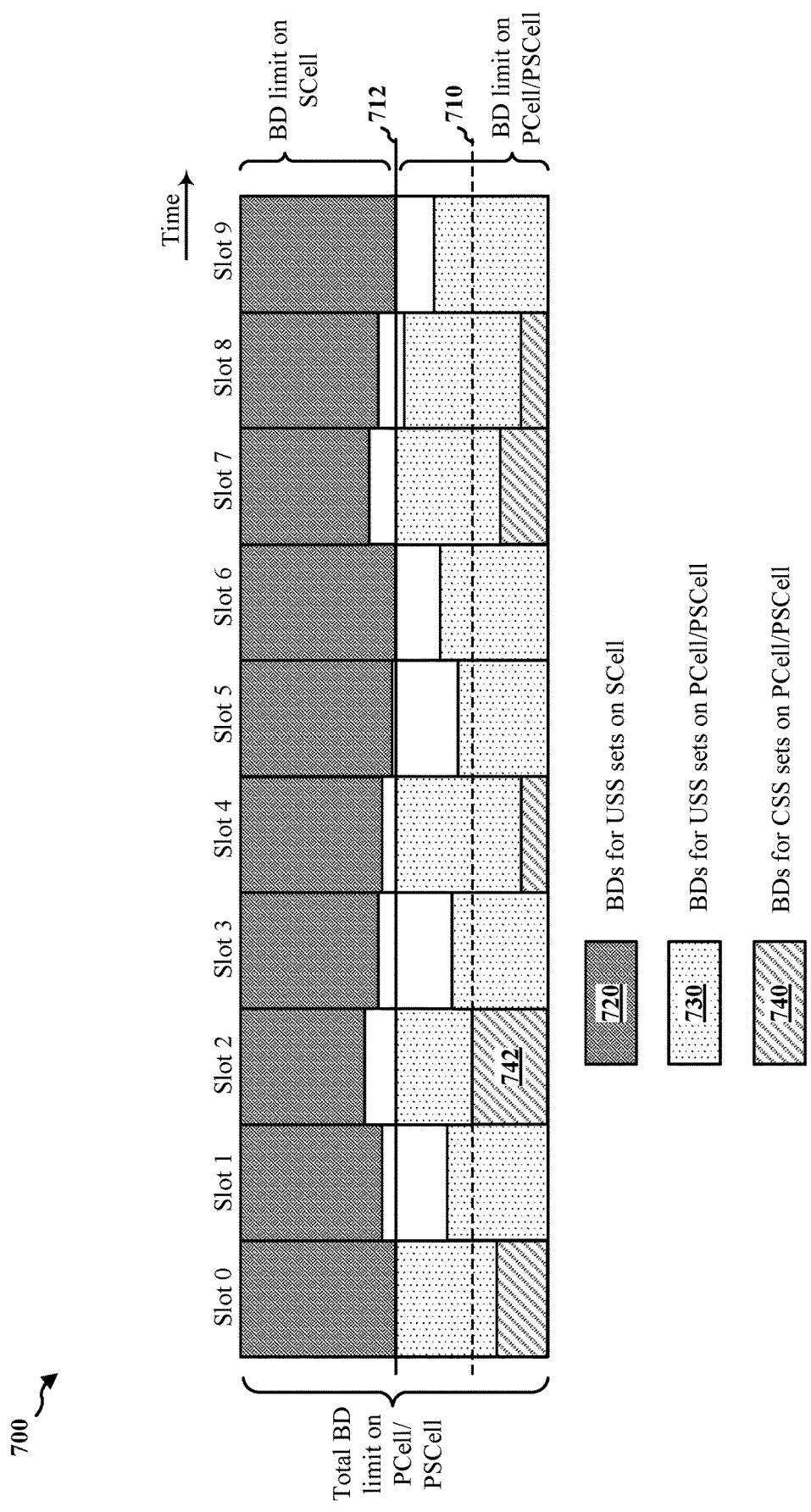
FIG. 7 is an example of BDs across time slots of cross-carrier scheduling for a method of wireless communication.

FIG. 7 is an example 700 of BDs across time slots of cross-carrier scheduling for a method of wireless communication. The example 700 may indicate the BDs for USS sets on SCell 720, the BDs for USS sets on PCell/PSCell 730, and the BDs for CSS sets on PCell/PSCell 740. The example 700 may be associated with the UE that may support the PDCCH candidates in the one or more USS sets on the SCell and in the one or more USS sets on the PCell/PSCell. Here, the example 700 indicates the BDs, but the current disclosure is not limited thereto, and the example 700 may indicate the non-overlapping CCEs. Also, the example 700 indicates that BDs are provided based on slots, but the current disclosure is not limited thereto, and the example 700 may be provided per PDCCH monitoring span.

In some aspects, the network may configure the first threshold and the second threshold to reserve a maximum number of PDCCH candidates for the one or more CSS sets and the one or more USS sets on the PCell/PSCell, i.e., the one or more PCell/PSCell CSSs 612 and the one or more PCell/PSCell USSs 614. That is, the first threshold may indicate the first maximum number of BDs and the second threshold The maximum available numbers of BDs and non-overlapping CCEs for PDCCH candidates for USS set(s) on the SCell, i.e., the one or more first SCell USSs 652, scheduling PDSCH/PUSCH on the PCell/PSCell can be determined based on the first threshold and the second threshold.

The network may configure the first threshold indicating a first maximum number of BDs and a second threshold indicating a second maximum number of non-overlapping CCEs for the PDCCH candidates on the PCell/PSCell. The first threshold and the second threshold may be transmitted to the UE, and the UE may receive an indication of the first threshold and the second threshold. The indication of the first threshold and the second threshold may be transmitted via an RRC message. That is, the RRC message transmitted by the base station to the UE may include an RRC parameter, e.g., virtual per-cell limits (or virtual/configurable per-scheduling-cell limits, virtual/configurable PCell/PSCell limits, etc.), indicating the numbers of BDs and non-overlapping CCEs allocated for the one or more CSSs and the one or more USSs on the PCell/PSCell. The parameter may be configurable and may have a range from the maximum of the numbers of BDs/CCEs for one or more CSSs on the PCell/PSCell across all the slots to the scheduled cell limit derived as the smaller of the single-cell limits and the CA limits. The CA limits may be derived based on the number of the DL cells for CA, the reported UE capability, e.g., pdcch-BlindDetectionCA, and the reference SCS.

In some aspects, after the network configures the first threshold indicating the first maximum number of BDs and the second threshold indicating the second maximum number of non-overlapping CCEs for the PDCCH candidates on the PCell/PSCell, the network may overbook the PDCCH for the one or more USSs on the PCell/PSCell within the first threshold and the second threshold for the maximum numbers of BDs and non-overlapping CCEs on the SCell. That is, the network may allocate the PDCCH candidates in the one or more USSs on the PCell/PSCell within the first threshold indicating the first maximum number of the BDs and the second threshold indicating the second maximum number of the non-overlapping CCEs on the PCell/PSCell, beyond the maximum of the numbers of the BDs and the non-overlapping CCEs for one or more CSSs on the PCell/PSCell across all the slots. The number of BDs available for PDCCH candidates on the SCell may be determined as the total BD limit minus RRC configured first threshold number of the BDs.

Referring to the example 700, the first threshold 712 indicating the maximum number of BDs for the CSSs and/or the USSs on the PCell/PSCell may be determined by the network, and the network may transmit an indication of the first threshold to the UE via the RRC message. The RRC configured first threshold 712 may be configured to have a value greater than the maximum BD number 710 on the PCell/PSCell across the slots. Here, the maximum BD number 710 on the PCell/PSCell across the slots is the number of the BDs 742 on the PCell/PSCell on the slot 2. The network may configure the one or more USSs on the SCell so that no PDCCH overbooking is configured. On the other hand, the network may configure the one or more USSs on the PCell/PSCell so that the PDCCH may be overbooked based on the first threshold 712 indicating the maximum number of BDs for the CSSs and/or the USSs on the PCell/PSCell. That is, the network may configure the USSs on the PCell/PSCell beyond the maximum BD number 710 and within the first threshold 712.

In response to receiving the network overbooking the PDCCH candidates in the one or more USSs on the PCell/PSCell beyond the maximum of the numbers of the BDs and the non-overlapping CCEs for one or more CSSs on the PCell/PSCell across all the slots, the UE may check and determine that at least one USS of the one or more USSs configured on the PCell/PSCell is scheduled beyond the maximum of the numbers of the BDs and the non-overlapping CCEs for one or more CSSs on the PCell/PSCell across all the slots. The UE may determine not to monitor the PDCCH candidates for the at least one USS of the one or more USSs configured on the PCell/PSCell that is scheduled beyond the maximum of the numbers of the BDs and the non-overlapping CCEs for one or more CSSs on the PCell/PSCell across all the slots.

In some aspects, the higher-layer configurations/parameters may be configured for the example 500 illustrated in FIG. 5 and the example 700 illustrated in FIG. 7. That is, the network may determine the first threshold indicating the first maximum number of the BDs and the second threshold indicating the second maximum number of the non-overlapping CCEs on the PCell/PSCell. The network may allocate the remaining number of the BDs and the non-overlapping CCEs available for the SCell. Accordingly, the PDCCH may be overbooked for the one or more USSs on the PCell/PSCell.

The total numbers of the BDs and non-overlapping CCEs allocated for the PDCCH candidates for scheduling PCell/PSCell may not exceed the per-cell limits (or the scheduled cell limits). That is, the total number of the BDs and the total number of the non-overlapping CCEs allocated for the PDCCH candidates on the PCell/PSCell and the SCell for each slot may not exceed the scheduled cell limits. The scheduled cell limits may indicate a first maximum number of the BDs for PDCCH candidates and a second maximum number of the non-overlapping CCEs for PDCCH candidates, and the total number of the BDs allocated for the PDCCH candidate may not exceed the first maximum number of the BDs for the PDCCH candidates and the total number of the non-overlapping CCEs allocated for the PDCCH candidates may not exceed the second maximum number of the non-overlapping CCEs for the PDCCH candidates.

In one aspect, different SCSs may be used for PDCCH on the PCell/PSCell and on the SCell, the lower SCS between the two SCSs is used as the reference SCS for determining the per-cell limits. That is, the PCell/PSCell may have a first SCS and the SCell may have a second SCS, and when the first SCS is greater than the second SCS, the network may use the second SCS of the SCell to determine the scheduled cell limits. When the second SCS of the SCell is greater than the first SCS of the PCell/PSCell, the network may use the first SCS of the PCell/PSCell to determine the scheduled cell limits. In another aspect, the same SCS may be used for PDCCH candidates on the PCell/PSCell and on the SCell, and the network may use the same SCS associated with the PCell/PSCell and the SCell for determining the scheduled cell limits.

In another aspect, the UE may report the PDCCH blind decoding capabilities supported by the UE for CA to the network. For example, the UE may signal a parameter, e.g., pdcch-BlindDetectionCA, indicating the PDCCH blind decoding capabilities supported by the UE for CA to the base station. The network, including the base station, may determine the scheduled cell limits based on the smaller of the single-cell limits and the CA limits. The CA limits may be derived based on the number of DL cells for CA, the reported UE capability, e.g., pdcch-BlindDetectionCA, and the reference SCS, e.g., 15 kHz.

In one aspect, the maximum numbers of the BDs and the non-overlapping CCEs for the PDCCH candidates for scheduling PCell/PSCell may be configured by the network, including the base station, and the configuration may be indicated to the UE using the RRC message. The value of the maximum numbers of the BDs and the non-overlapping CCEs for the PDCCH candidates for scheduling PCell/PSCell may configure in the range from the maximum of the numbers of the BDs and the non-overlapping CCEs for CSS sets on the PCell/PSCell across all the slots to the scheduled cell limits derived as the smaller of the single-cell limits and the CA limits. The CA limits may be derived based on the number of the DL cells for CA, the reported UE capability, e.g., pdcch-BlindDetectionCA, and the reference SCS, e.g., 15 kHz.

The Maximum numbers of BDs and non-overlapping CCEs for the PDCCH candidates for scheduling PCell/PSCell on SCell may be determined by the scheduled cell limits minus the first threshold indicating the first maximum number of BDs and the second threshold indicating the second maximum number of the non-overlapping CCEs for PDCCH candidates for scheduling PCell/PSCell.

Figure 8:
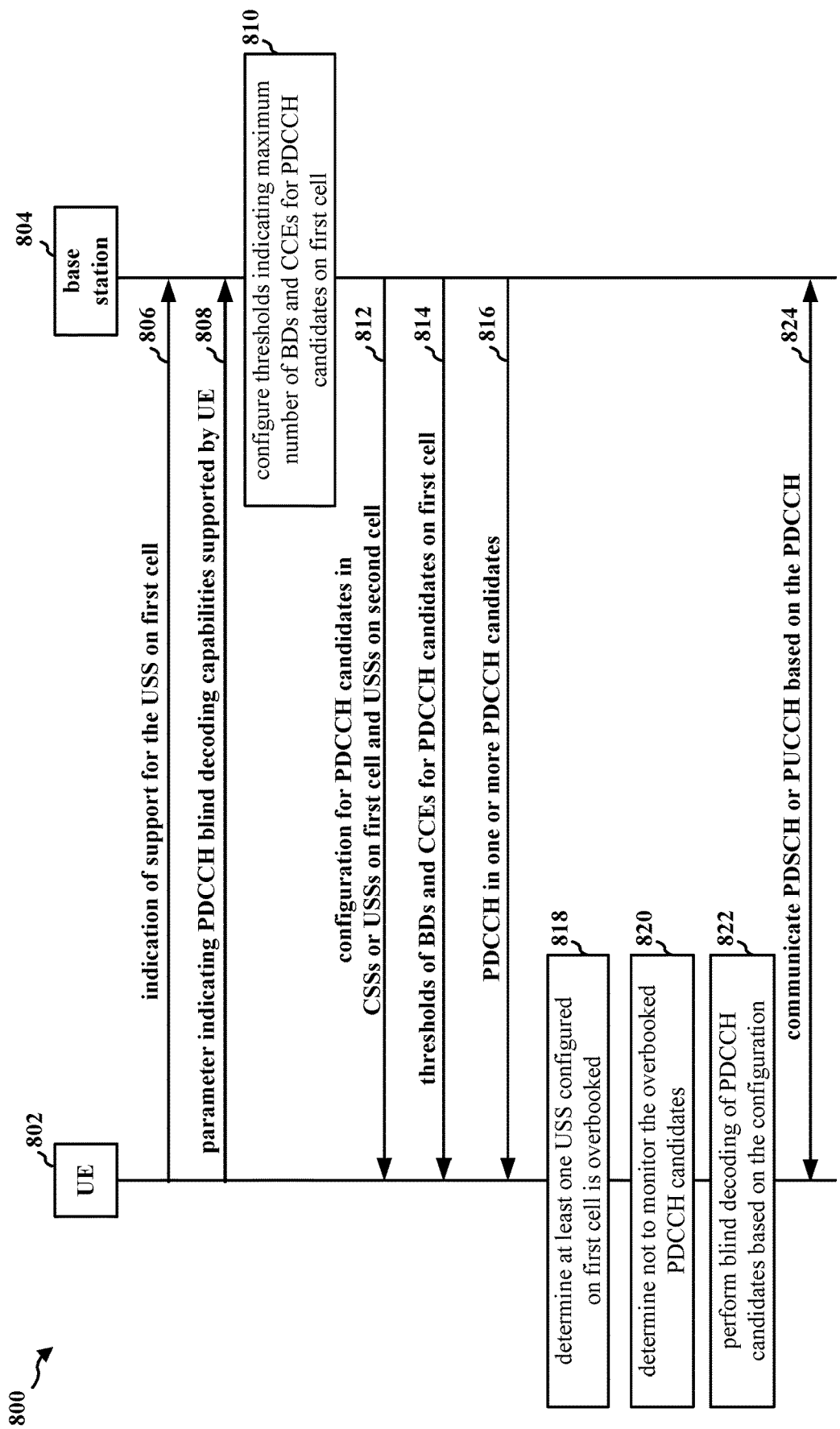
FIG. 8 is a communication diagram of a method of wireless communication.

FIG. 8 is a call-flow diagram 800 of a method of wireless communication. The call-flow diagram 800 may include a UE 802 and a base station 804. The base station 804 may configure a first threshold indicating maximum numbers of BDs and non-overlapping CCEs for PDCCH candidates on a PCell/PSCell, and transmit, to UE 802, a configuration for PDCCH candidates in CSSs or USSs on the PCell/PSCell and USSs on a SCell for PDCCH scheduling data for the PCell/PSCell. The base station 804 may transmit at least one PDCCH in PDCCH candidates. The UE 802 may receive the configuration and receive the PDCCH by blindly decoding the PDCCH candidates in in at least one of the CSSs or the USSs configured on the PCell/PSCell and the USSs configured on the Scell. The USSs configured on the PCell/PSCell may support PDCCH overbooking.

At 806, the base station 804 may receive, from a UE 802 an indication of support for the USS on the first cell, wherein the configuration for the USS on the first cell is based on the UE 802 supporting the one or more USSs on the first cell. The UE 802 may transmit, to the base station 804, an indication of support for the USS on the first cell, wherein the configuration for the USS on the first cell is based on the UE 802 supporting the one or more USSs on the first cell.

At 808, the base station 804 may receive, from the UE 802, a parameter indicating PDCCH blind decoding capabilities supported by the UE 802 for CA. The UE 802 may report, to the base station 804, the parameter indicating PDCCH blind decoding capabilities supported by the UE 802 for CA. In some aspects, the base station 804 may determine the scheduled cell limits based on the smaller of the single-cell limits and the CA limits. The CA limits may be derived based on the number of DL cells for CA, the reported UE 802 capability, and the reference SCS.

At 810, the base station 804 may configure a first threshold indicating a first maximum BDs a second threshold indicating a second maximum number of non-overlapping CCEs for PDCCH candidates on a first cell. In one aspect, the base station 804 may configure a first threshold indicating a first maximum number of BDs and a second threshold indicating a second maximum number of non-overlapping CCEs for the CSSs on the first cell to be based on a slot having the highest number of BDs and non-overlapping CCEs for the CSSs, a third maximum number of BDs for the USSs on the second cell to be based on the scheduled cell limit of BDs minus the first threshold, and a fourth maximum number of non-overlapping CCEs for the USSs on the second cell to be based on the scheduled cell limit of non-overlapping CCEs minus the second threshold. In one aspect, one or more USSs may be configured on the first cell based on the indication that the UE 802 supports the USS on the first cell received from the UE 802 at 806.

At 812, the base station 804 may transmit, to the UE 802, a configuration for one or more PDCCH candidates in one or more CSSs configured on the first cell and one or more USSs configured on a second cell for PDCCH including scheduling data for the first cell. The UE 802 may receive, from the base station 804, the configuration for one or more PDCCH candidates in one or more CSSs configured on the first cell and one or more USSs configured on the second cell for PDCCH including scheduling data for the first cell. In some aspects, the first cell includes at least one of the PCell or the PSCell, and the second cell includes the SCell. The configuration may further include the one or more PDCCH candidates in one or more USSs configured on the first cell.

At 814, the base station 804 may transmit, to the UE 802, an indication of a first threshold indicating a first maximum number of BDs and a second threshold indicating a second maximum number of non-overlapping CCEs for the PDCCH candidates on the first cell. The UE 802 may receive, from the base station 804, the indication of the first threshold indicating a first maximum number of BDs and a second threshold indicating a second maximum number of non-overlapping CCEs for the PDCCH candidates on the first cell.

In one aspect, the first threshold and the second threshold may be transmitted and received via an RRC message. In another aspect, the base station 804 may transmit the RRC message to configure the first threshold indicating the first maximum number of the BDs and the second threshold indicating the second maximum number of non-overlapping CCEs for the PDCCH candidates on the first cell. The UE may determine a third threshold for a third maximum number BDs and a fourth threshold for a fourth maximum number of non-overlapping CCEs for the CSSs on the first cell based on a slot having the highest number of BDs and non-overlapping CCEs for the CSSs, and the first threshold may have a value greater than or equal to the third threshold and the second threshold may have a value greater than or equal to the fourth threshold. That is, the first threshold indicating the first maximum number of the BDs configured by the RRC message may be greater than or equal to the third threshold for the third maximum number of BDs determined based on a slot having the highest number of BDs, and the second threshold indicating the second maximum number of non-overlapping CCEs may be greater than or equal to the fourth threshold for the fourth maximum number of the non-overlapping CCEs determined based on a slot having the highest number of non-overlapping CCEs.

At 816, the base station 804 transmits, to the UE 802, at least one PDCCH in one or more PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates. The UE 802 may receive, from the base station 804, at least one PDCCH in one or more of the PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates.

In one aspect, the scheduled cell limit including the first total number of BDs and the second total number of non-overlapping CCEs for PDCCH candidates may be based on a smaller or the same SCS associated with the first cell or the second cell. In another aspect, the scheduled cell limit may have values less than or equal to a CA limit of the first cell and the second cell. In another aspect, the scheduled cell limit may be set less than or equal to the PDCCH blind decoding capabilities supported by the UE 802 indicated by the parameter received at 808.

At 818, the UE 802 may determine that at least one USS of the first USSs configured on the first cell is scheduled beyond the first threshold or the second threshold of the first cell.

At 820, the UE 802 may determine not to monitor the PDCCH candidates for the at least one USS of the first USSs scheduled beyond the first threshold or the second threshold, in response to determining that the at least one USS of the first USSS configured on the first cell is scheduled beyond the first threshold or the second threshold at 818.

At 822, the UE 802 may perform blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. The UE 802 may further perform the blind decoding of the one or more CSSs on the first cell and the one or more USSs on the first cell within the first threshold and the second threshold based on the configuration received at 812.

At 824, the base station 804 may transmit a PDSCH to the UE 802 or receive a PUSCH from the UE 802 on the first cell based on the PDCCH transmitted at 816. The UE 802 may receive a PDSCH from the base station 804 or transmitting a PUSCH to the base station 804 on the first cell based on the PDCCH decoded at 822.

Figure 9:
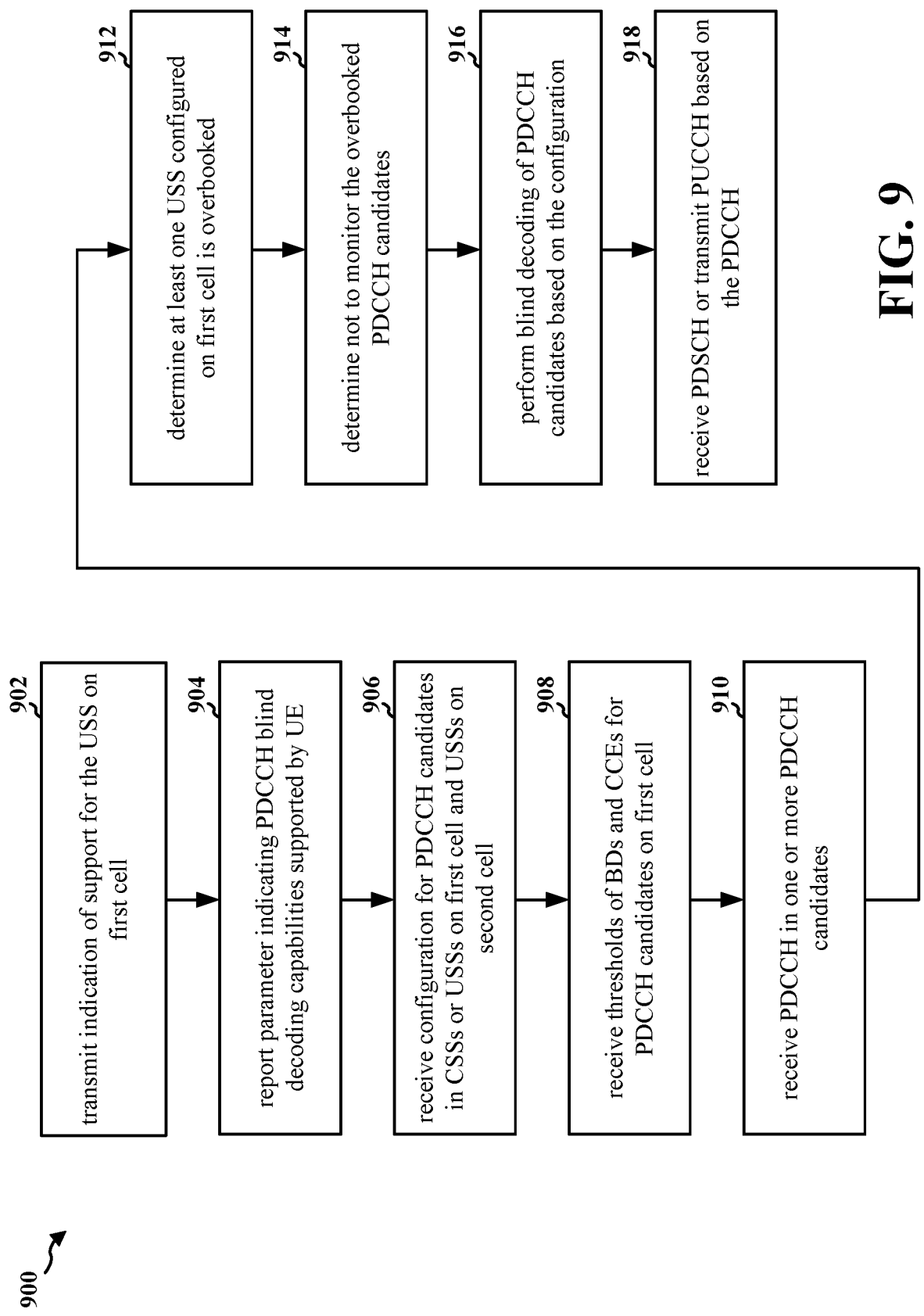
FIG. 9 is a flowchart of a method of wireless communication.

FIG. 9 is a flowchart 900 of a method of wireless communication. The method may be performed by a UE (e.g., the UE 104; the apparatus 1302). The UE may receive, from a base station, a configuration for PDCCH candidates in CSSs or USSs on the PCell/PSCell and USSs on a SCell for PDCCH scheduling data for the PCell/PSCell. The UE may receive, from the base station, at least one PDCCH in PDCCH candidates by blindly decoding the PDCCH candidates in in at least one of the CSSs or the USSs configured on the PCell/PSCell and the USSs configured on the Scell. The USSs configured on the PCell/PSCell may support PDCCH overbooking.

At 902, the UE may transmit, to the base station, an indication of support for the USS on the first cell, wherein the configuration for the USS on the first cell is based on the UE supporting the one or more USSs on the first cell. For example, at 806, the UE 802 may transmit, to the base station 804, an indication of support for the USS on the first cell, wherein the configuration for the USS on the first cell is based on the UE 802 supporting the one or more USSs on the first cell. Furthermore, 902 may be performed by a PDCCH cross-carrier scheduling component 1340.

At 904, the UE may report, to the base station, the parameter indicating PDCCH blind decoding capabilities supported by the UE for CA. In some aspects, the base station may determine the scheduled cell limits based on the smaller of the single-cell limits and the CA limits. The CA limits may be derived based on the number of DL cells for CA, the reported UE capability, and the reference SCS. For example, at 808, the UE 802 may report, to the base station 804, the parameter indicating PDCCH blind decoding capabilities supported by the UE 802 for CA. Furthermore, 904 may be performed by the PDCCH cross-carrier scheduling component 1340.

At 906, the UE receives, from the base station, the configuration for one or more PDCCH candidates in one or more CSSs configured on the first cell and one or more USSs configured on the second cell for PDCCH including scheduling data for the first cell. In some aspects, the first cell includes at least one of the PCell or the PSCell, and the second cell includes the SCell. The configuration may further include the one or more PDCCH candidates in one or more USSs configured on the first cell. For example, at 812, the UE 802 may receive, from the base station 804, the configuration for one or more PDCCH candidates in one or more CSSs configured on the first cell and one or more USSs configured on the second cell for PDCCH including scheduling data for the first cell. Furthermore, 906 may be performed by the PDCCH cross-carrier scheduling component 1340.

At 908, the UE may receive, from the base station, the indication of the first threshold indicating a first maximum number of BDs and a second threshold indicating a second maximum number of non-overlapping CCEs for the PDCCH candidates on the first cell. In one aspect, the first threshold and the second threshold may be transmitted and received via an RRC message. In another aspect, the UE may receive the RRC message configuring the first threshold indicating the first maximum number of the BDs and the second threshold indicating the second maximum number of non-overlapping CCEs for the PDCCH candidates on the first cell. The UE may determine a third threshold for a third maximum number BDs and a fourth threshold for a fourth maximum number of non-overlapping CCEs for the CSSs on the first cell based on a slot having the highest number of BDs and non-overlapping CCEs for the CSSs, and the first threshold may have a value greater than or equal to the third threshold and the second threshold may have a value greater than or equal to the fourth threshold. That is, the first threshold indicating the first maximum number of the BDs configured by the RRC message may be greater than or equal to the third threshold for the third maximum number of BDs determined based on a slot having the highest number of BDs, and the second threshold indicating the second maximum number of non-overlapping CCEs may be greater than or equal to the fourth threshold for the fourth maximum number of the non-overlapping CCEs determined based on a slot having the highest number of non-overlapping CCEs. For example, at 814, the UE 802 may receive, from the base station 804, the indication of the first threshold indicating a first maximum number of BDs and a second threshold indicating a second maximum number of non-overlapping CCEs for the PDCCH candidates on the first cell. Furthermore, 908 may be performed by the PDCCH cross-carrier scheduling component 1340.

At 910, the UE may receive, at least one PDCCH in one or more of the PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates. That is, the UE may monitor the PDCCH candidates on the first cell and the second cell to receive the PDCCH transmitted by the base station. In one aspect, the scheduled cell limit including a first total number of BDs and a second total number of non-overlapping CCEs for PDCCH candidates may be based on a smaller or the same SCS associated with the first cell or the second cell. In another aspect, the scheduled cell limit may have values less than or equal to a CA limit of the first cell and the second cell. In another aspect, the scheduled cell limit may be set less than or equal to the PDCCH blind decoding capabilities supported by the UE indicated by the parameter received at 904. For example, at 816, the UE 802 may receive, from the base station 804, at least one PDCCH in one or more of the PDCCH candidates. Furthermore, 910 may be performed by the PDCCH cross-carrier scheduling component 1340.

At 912, the UE may determine that at least one USS of the first USSs configured on the first cell is scheduled beyond the first threshold or the second threshold of the first cell. For example, at 818, the UE 802 may determine that at least one USS of the first USSs configured on the first cell is scheduled beyond the first threshold or the second threshold of the first cell. Furthermore, 912 may be performed by a PDCCH overbooking component 1342.

At 914, the UE may determine not to monitor the PDCCH candidates for the at least one USS of the first USSs scheduled beyond the first threshold or the second threshold, in response to determining that the at least one USS of the first USSS configured on the first cell is scheduled beyond the first threshold or the second threshold and within the first threshold at 912. For example, at 820, the UE 802 may determine not to monitor the PDCCH candidates for the at least one USS of the first USSs scheduled beyond the first threshold or the second threshold. Furthermore, 914 may be performed by the PDCCH overbooking component 1342.

At 916, the UE may perform blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. The UE may further perform the blind decoding of the one or more CSSs on the first cell and the one or more USSs on the first cell within the first threshold and the second threshold based on the configuration received at 906. For example, at 822, the UE 802 may perform blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. Furthermore, 916 may be performed by a PDCCH decoding component 1344.

At 918, the UE may receive a PDSCH from the base station or transmitting a PUSCH to the base station on the first cell based on the PDCCH decoded at 916. For example, at 824, the UE 802 may receive a PDSCH from the base station 804 or transmitting a PUSCH to the base station 804 on the first cell based on the PDCCH decoded at 822. Furthermore, 918 may be performed by an uplink/downlink communicating component 1346.

Figure 10:
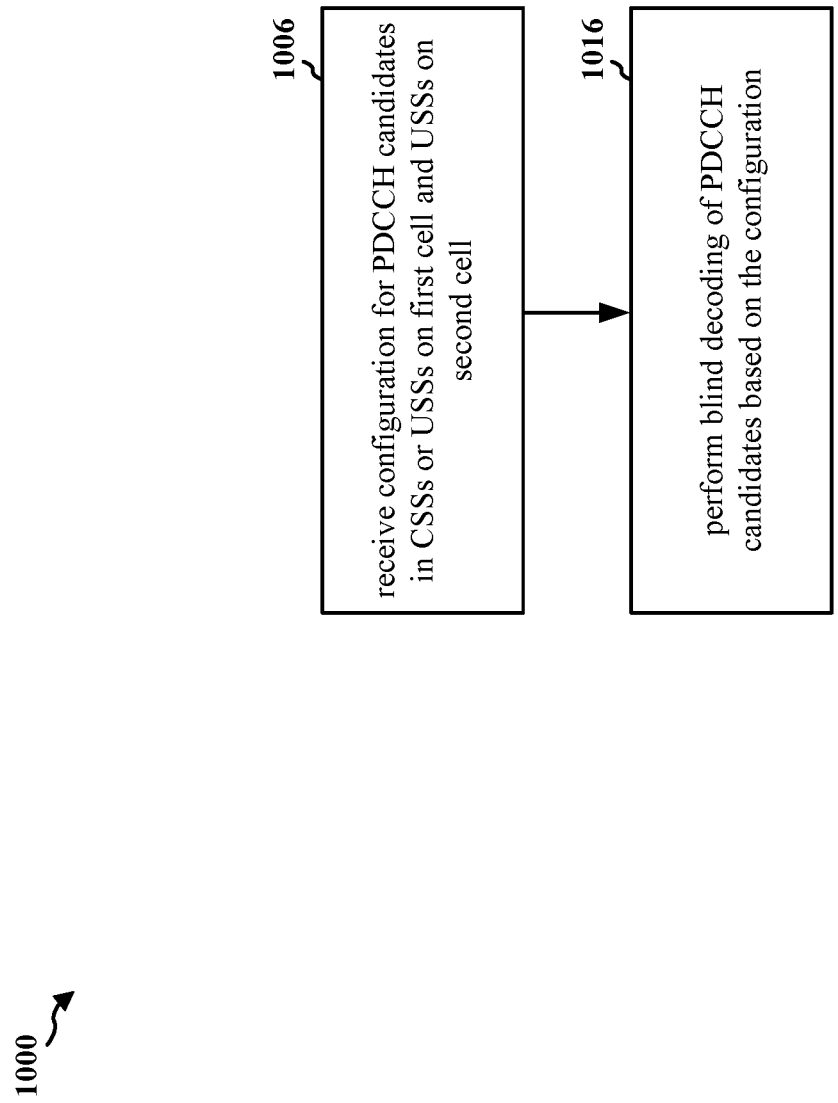
FIG. 10 is a flowchart of a method of wireless communication.

FIG. 10 is a flowchart 1000 of a method of wireless communication. The method may be performed by a UE (e.g., the UE 104; the apparatus 1302). The UE may receive, from a base station, a configuration for PDCCH candidates in CSSs or USSs on the PCell/PSCell and USSs on a SCell for PDCCH scheduling data for the PCell/PSCell. The UE may receive, from the base station, at least one PDCCH in PDCCH candidates by blindly decoding the PDCCH candidates in in at least one of the CSSs or the USSs configured on the PCell/PSCell and the USSs configured on the Scell. The USSs configured on the PCell/PSCell may support PDCCH overbooking.

At 1006, the UE receives, from the base station, the configuration for one or more PDCCH candidates in one or more CSSs configured on the first cell and one or more USSs configured on the second cell for PDCCH including scheduling data for the first cell. In some aspects, the first cell includes at least one of the PCell or the PSCell, and the second cell includes the SCell. The configuration may further include the one or more PDCCH candidates in one or more USSs configured on the first cell. For example, at 812, the UE 802 may receive, from the base station 804, the configuration for one or more PDCCH candidates in one or more CSSs configured on the first cell and one or more USSs configured on the second cell for PDCCH including scheduling data for the first cell. Furthermore, 1006 may be performed by the PDCCH cross-carrier scheduling component 1340.

At 1016, the UE may perform blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. The UE may further perform the blind decoding of the one or more CSSs on the first cell and the one or more USSs on the first cell within the first threshold and the second threshold based on the configuration received at 1006. For example, at 822, the UE 802 may perform blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. Furthermore, 1016 may be performed by a PDCCH decoding component 1344.

Figure 11:
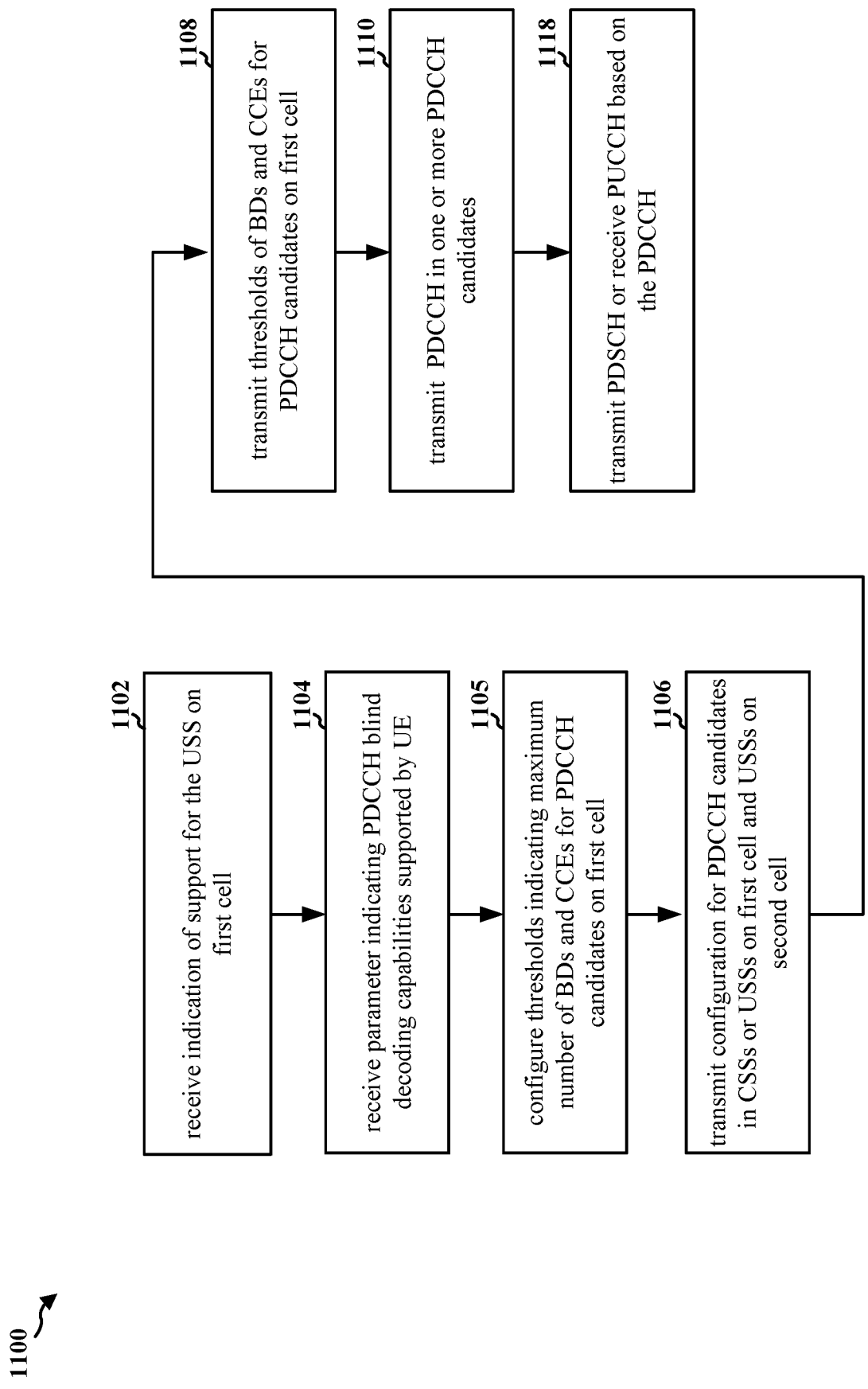
FIG. 11 is a flowchart of a method of wireless communication.

FIG. 11 is a flowchart 1100 of a method of wireless communication. The method may be performed by a base station (e.g., the base station 102/180; the apparatus 1402). The base station may configure a first threshold indicating maximum numbers of BDs and non-overlapping CCEs for PDCCH candidates on a PCell/PSCell, and transmit, to a UE, a configuration for PDCCH candidates in CSSs or USSs on the PCell/PSCell and USSs on a SCell for PDCCH scheduling data for the PCell/PSCell. The base station may transmit at least one PDCCH in PDCCH candidates. The USSs configured on the PCell/PSCell may support PDCCH overbooking.

At 1102, the base station may receive an indication of support for the USS on the first cell, wherein the configuration for the USS on the first cell is based on the UE supporting the one or more USSs on the first cell. In some aspects, the base station may determine the scheduled cell limits based on the smaller of the single-cell limits and the CA limits. The CA limits may be derived based on the number of DL cells for CA, the reported UE capability, and the reference SCS. For example, at 806, the base station 804 may receive, from a UE 802 an indication of support for the USS on the first cell, wherein the configuration for the USS on the first cell is based on the UE 802 supporting the one or more USSs on the first cell. Furthermore, 1102 may be performed by a PDCCH cross-carrier scheduling component 1440.

At 1104, the base station may receive, from the UE, a parameter indicating PDCCH blind decoding capabilities supported by the UE for CA. For example, at 808, the base station 804 may receive, from the UE 802, a parameter indicating PDCCH blind decoding capabilities supported by the UE 802 for CA. Furthermore, 1104 may be performed by the PDCCH cross-carrier scheduling component 1440.

At 1105, the base station may configure a first threshold indicating a first maximum BDs a second threshold indicating a second maximum number of non-overlapping CCEs for PDCCH candidates on a first cell. In one aspect, the base station may configure a first threshold indicating a first maximum number of BDs and a second threshold indicating a second maximum number of non-overlapping CCEs for the CSSs on the first cell to be based on a slot having the highest number of BDs and non-overlapping CCEs for the CSSs, a third maximum number of BDs for the USSs on the second cell to be based on the scheduled cell limit of BDs minus the first threshold, and a fourth maximum number of non-overlapping CCEs for the USSs on the second cell to be based on the scheduled cell limit of non-overlapping CCEs minus the second threshold. In one aspect, one or more USSs may be configured on the first cell based on the indication that the UE supports the USS on the first cell received from the UE at 1102. For example, at 810, the base station 804 may configure a first threshold indicating a first maximum BDs a second threshold indicating a second maximum number of non-overlapping CCEs for PDCCH candidates on a first cell. Furthermore, 1105 may be performed by the PDCCH cross-carrier scheduling component 1440.

At 1106, the base station may transmit, to the UE, a configuration for one or more PDCCH candidates in one or more CSSs configured on the first cell and one or more USSs configured on a second cell for PDCCH including scheduling data for the first cell. In some aspects, the first cell includes at least one of the PCell or the PSCell, and the second cell includes the SCell. The configuration may further include the one or more PDCCH candidates in one or more USSs configured on the first cell. For example, at 816, the base station 804 may transmit, to the UE 802, a configuration for one or more PDCCH candidates in one or more CSSs configured on the first cell and one or more USSs configured on a second cell for PDCCH including scheduling data for the first cell. Furthermore, 1106 may be performed by the PDCCH cross-carrier scheduling component 1440.

At 1108, the base station may transmit, to the UE, an indication of a first threshold indicating a first maximum number of BDs and a second threshold indicating a second maximum number of non-overlapping CCEs for the PDCCH candidates on the first cell. In one aspect, the first threshold and the second threshold may be transmitted and received via an RRC message. In another aspect, the base station may transmit the RRC message to configure the first threshold indicating the first maximum number of the BDs and the second threshold indicating the second maximum number of non-overlapping CCEs for the PDCCH candidates on the first cell. The UE may determine a third threshold for a third maximum number BDs and a fourth threshold for a fourth maximum number of non-overlapping CCEs for the CSSs on the first cell based on a slot having the highest number of BDs and non-overlapping CCEs for the CSSs, and the first threshold may have a value greater than or equal to the third threshold and the second threshold may have a value greater than or equal to the fourth threshold. That is, the first threshold indicating the first maximum number of the BDs configured by the RRC message may be greater than or equal to the third threshold for the third maximum number of BDs determined based on a slot having the highest number of BDs, and the second threshold indicating the second maximum number of non-overlapping CCEs may be greater than or equal to the fourth threshold for the fourth maximum number of the non-overlapping CCEs determined based on a slot having the highest number of non-overlapping CCEs. For example, at 814, the base station 804 may transmit, to the UE 802, an indication of a first threshold indicating a first maximum number of BDs and a second threshold indicating a second maximum number of non-overlapping CCEs for the PDCCH candidates on the first cell. Furthermore, 1108 may be performed by the PDCCH cross-carrier scheduling component 1440.

At 1110, the base station may transmit, to the UE, at least one PDCCH in one or more PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates. In one aspect, the scheduled cell limit including the first total number of BDs and the second total number of non-overlapping CCEs for PDCCH candidates may be based on a smaller or the equal SCS between the first cell and the second cell. In another aspect, the scheduled cell limit may have values less than or equal to a CA limit of the first cell and the second cell. In another aspect, the scheduled cell limit may be set less than or equal to the PDCCH blind decoding capabilities supported by the UE indicated by the parameter received at 1104. For example, at 816, the base station 804 may transmit, to the UE 802, at least one PDCCH in one or more PDCCH candidates in at least one of one or more CSSs or one or more USSs. Furthermore, 1110 may be performed by a PDCCH transmitting component 1442.

At 1118, the base station may transmit a PDSCH to the UE or receive a PUSCH from the UE on the first cell based on the PDCCH transmitted at 1110. For example, at 824, the base station 804 may transmit a PDSCH to the UE 802 or receive a PUSCH from the UE 802 on the first cell based on the PDCCH transmitted at 816. Furthermore, 1118 may be performed by an uplink/downlink communicating component 1446.

Figure 12:
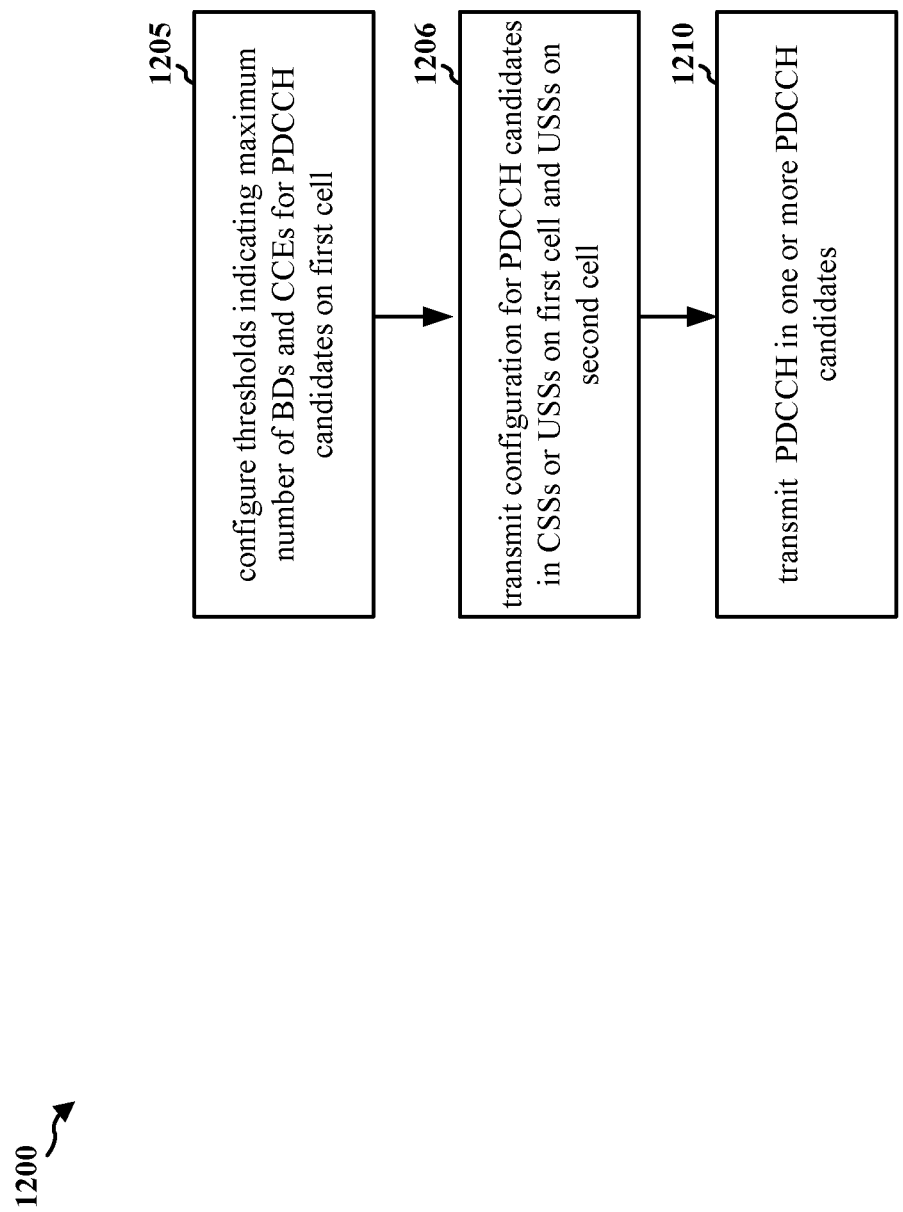
FIG. 12 is a flowchart of a method of wireless communication.

FIG. 12 is a flowchart 1200 of a method of wireless communication. The method may be performed by a base station (e.g., the base station 102/180; the apparatus 1402). The base station may configure a first threshold indicating maximum numbers of BDs and non-overlapping CCEs for PDCCH candidates on a PCell/PSCell, and transmit, to a UE, a configuration for PDCCH candidates in CSSs or USSs on the PCell/PSCell and USSs on a SCell for PDCCH scheduling data for the PCell/PSCell. The base station may transmit at least one PDCCH in PDCCH candidates. The USSs configured on the PCell/PSCell may support PDCCH overbooking.

At 1205, the base station may configure a first threshold indicating a first maximum BDs a second threshold indicating a second maximum number of non-overlapping CCEs for PDCCH candidates on a first cell. In one aspect, the base station may configure a first threshold indicating a first maximum number of BDs and a second threshold indicating a second maximum number of non-overlapping CCEs for the CSSs on the first cell to be based on a slot having the highest number of BDs and non-overlapping CCEs for the CSSs, a third maximum number of BDs for the USSs on the second cell to be based on the scheduled cell limit of BDs minus the first threshold, and a fourth maximum number of non-overlapping CCEs for the USSs on the second cell to be based on the scheduled cell limit of non-overlapping CCEs minus the second threshold. In one aspect, one or more USSs may be configured on the first cell based on the indication that the UE supports the USS on the first cell received from the UE at 1202. For example, at 810, the base station 804 may configure a first threshold indicating a first maximum BDs a second threshold indicating a second maximum number of non-overlapping CCEs for PDCCH candidates on a first cell. Furthermore, 1205 may be performed by the PDCCH cross-carrier scheduling component 1440.

At 1206, the base station may transmit, to the UE, a configuration for one or more PDCCH candidates in one or more CSSs configured on the first cell and one or more USSs configured on a second cell for PDCCH including scheduling data for the first cell. In some aspects, the first cell includes at least one of the PCell or the PSCell, and the second cell includes the SCell. The configuration may further include the one or more PDCCH candidates in one or more USSs configured on the first cell. For example, at 816, the base station 804 may transmit, to the UE 802, a configuration for one or more PDCCH candidates in one or more CSSs configured on the first cell and one or more USSs configured on a second cell for PDCCH including scheduling data for the first cell. Furthermore, 1206 may be performed by the PDCCH cross-carrier scheduling component 1440.

At 1210, the base station may transmit, to the UE, at least one PDCCH in one or more PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates. In one aspect, the scheduled cell limit including the first total number of BDs and the second total number of non-overlapping CCEs for PDCCH candidates may be based on a smaller or the equal SCS between the first cell and the second cell. In another aspect, the scheduled cell limit may have values less than or equal to a CA limit of the first cell and the second cell. In another aspect, the scheduled cell limit may be set less than or equal to the PDCCH blind decoding capabilities supported by the UE indicated by the parameter received at 1204. For example, at 816, the base station 804 may transmit, to the UE 802, at least one PDCCH in one or more PDCCH candidates in at least one of one or more CSSs or one or more USSs. Furthermore, 1210 may be performed by a PDCCH transmitting component 1442.

Figure 13:
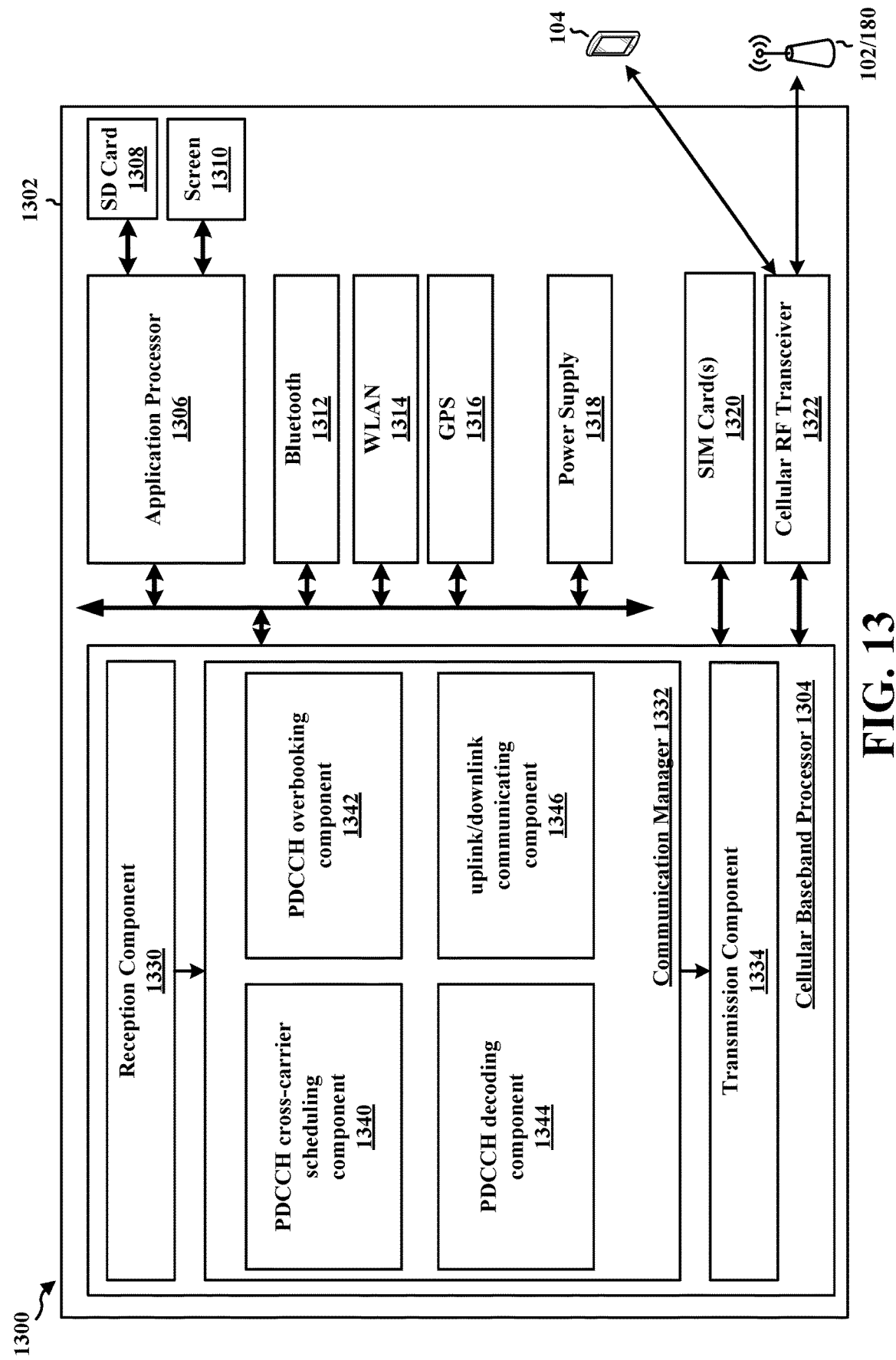
FIG. 13 is a diagram illustrating an example of a hardware implementation for an example apparatus.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 includes a PDCCH cross-carrier scheduling component 1340 that is configured to transmit an indication of support for the USS on the first cell, report the parameter indicating PDCCH blind decoding capabilities supported by the UE for CA, receive the configuration for one or more PDCCH candidates in one or more CSSs configured on the first cell and one or more USSs configured on the second cell for PDCCH including scheduling data for the first cell, receive the indication of the first threshold indicating a first maximum number of BDs and a second threshold indicating a second maximum number of non-overlapping CCEs for the PDCCH candidates on the first cell, and receive, at least one PDCCH in one or more of the PDCCH candidates, e.g., as described in connection with 902, 904, 906, 908, 910, and 1006. The communication manager 1332 further includes a PDCCH overbooking component 1342 that is configured to determine that at least one USS of the first USSs configured on the first cell is scheduled beyond the first threshold or the second threshold of the first cell, and determine not to monitor the PDCCH candidates for the at least one USS of the first USSs scheduled beyond the first threshold or the second threshold, e.g., as described in connection with 912 and 914. The communication manager 1332 further includes a PDCCH decoding component 1344 that is configured to perform blind decoding of the one or more PDCCH candidates in at least one of the one or more CSSs or one or more USSs on the first cell and the one or more USSs on the second cell, e.g., as described in connection with 916 and 1016. The communication manager 1332 further includes an uplink/downlink communicating component 1346 that is configured to receive a PDSCH from the base station or transmitting a PUSCH to the base station on the first cell, e.g., as described in connection with 918.

The apparatus may include additional components that perform each of the blocks of the algorithm in the flowcharts of FIGS. 8, 9, and 10. As such, each block in the flowcharts of FIGS. 8, 9, and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, includes means for receiving, from a base station, a configuration for one or more PDCCH candidates in one or more CSSs configured on a first cell and one or more USSs configured on a second cell for PDCCH including scheduling data for the first cell, the first cell including at least one of a PCell or a PSCell, and the second cell including an SCell, and means for performing blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates. The apparatus 1302 includes means for reporting, to the base station, a parameter indicating PDCCH blind decoding capabilities supported by the UE for CA. The apparatus 1302 includes means for receiving a PDCCH in one or more of the PDCCH candidates, and receiving a PDSCH from the base station or transmitting a PUSCH to the base station on the first cell based on the PDCCH, and means for performing blind decoding of the one or more CSSs on the first cell and the one or more USSs on the first cell within the first threshold and the second threshold. The apparatus 1302 includes means for determining that at least one USS of the first USSs configured on the first cell is scheduled beyond the first threshold or the second threshold of the first cell, and means for determining not to monitor the PDCCH candidates for the at least one USS of the first USSs scheduled beyond the first threshold or the second threshold. The apparatus 1302 includes means for transmitting an indication of support for the one or more USSs on the first cell, wherein the configuration for the one or more USSs on the first cell is based on the UE supporting the one or more USSs on the first cell. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 14 is a diagram 1400 illustrating an example of a hardware implementation for an apparatus 1402. The apparatus 1402 may be a network node. The apparatus 1402 may be a base station, a component of a base station, or may implement base station functionality. In some aspects, the apparatus 1302 may include a baseband unit 1404. The baseband unit 1404 may communicate through a cellular RF transceiver 1422 with the UE 104. In some aspects, the apparatus 1402 may include the cellular RF transceiver 1422. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes a PDCCH cross-carrier scheduling component 1440 that is configured to receive an indication of support for the USS on the first cell, receive a parameter indicating PDCCH blind decoding capabilities supported by the UE for CA, configure a first threshold indicating a first maximum BDs a second threshold indicating a second maximum number of non-overlapping CCEs for PDCCH candidates on a first cell, transmit a configuration for one or more PDCCH candidates in one or more CSSs configured on the first cell and one or more USSs configured on a second cell for PDCCH including scheduling data for the first cell, and transmit an indication of a first threshold indicating a first maximum number of BDs and a second threshold indicating a second maximum number of non-overlapping CCEs for the PDCCH candidates on the first cell, e.g., as described in connection with 1102, 1104, 1105, 1106, 1108, 1205, and 1206. The communication manager 1432 further includes a PDCCH transmitting component 1442 that is configured to transmit, to the UE, at least one PDCCH in one or more PDCCH candidates in at least one of one or more CSSs or one or more USSs configured on the first cell and the one or more USSs configured on the second cell for PDCCH, e.g., as described in connection with 1110 and 1210. The communication manager 1432 further includes an uplink/downlink communicating component 1446 that is configured to transmit a PDSCH to the UE or receive a PUSCH from the UE on the first cell, e.g., as described in connection with 1118.

The apparatus may include additional components that perform each of the blocks of the algorithm in the flowcharts of FIGS. 8, 10, and 11. As such, each block in the flowcharts of FIGS. 8, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for configuring a first threshold indicating a first maximum number of BDs and a second threshold indicating a second maximum number of non-overlapping CCEs for PDCCH candidates on a first cell, means for transmitting, to a UE, a configuration for one or more PDCCH candidates in one or more CSSs configured on the first cell and one or more USSs configured on a second cell for PDCCH including scheduling data for the first cell, the first cell including at least one of a PCell or a PSCell, and the second cell including an SCell, and means for transmitting, to the UE, at least one PDCCH in one or more PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates. The apparatus 1402 includes means for receiving, from the UE, a parameter indicating PDCCH blind decoding capabilities supported by the UE for CA, means for transmitting a PDSCH to the UE or receiving a PUSCH from the UE on the first cell based on the PDCCH, and means for receiving an indication of support for the one or more USSs on the first cell, wherein the configuration for the one or more USSs on the first cell is based on the UE supporting the one or more USSs on the first cell. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

The apparatus may include a base station and a UE. The base station may configure a first threshold indicating a first maximum number of BDs and a second threshold indicating a second maximum number of non-overlapping CCEs for PDCCH candidates on a first cell, transmit, to the UE, a configuration for one or more PDCCH candidates in one or more CSSs configured on the first cell and one or more USSs configured on a second cell for PDCCH including scheduling data for the first cell, the first cell including at least one of a PCell or a PSCell, and the second cell including a SCell, and transmit, to the UE, at least one PDCCH in one or more PDCCH candidates in at least one of one or more CSSs or one or more USSs configured on the first cell and the one or more USSs configured on the second cell for PDCCH including scheduling of the first cell based on the configuration and within a scheduled cell limit including a total number of BDs and non-overlapping CCEs for the PDCCH candidates.

The UE may receive, from the base station, the configuration for one or more PDCCH candidates in one or more CSSs configured on the first cell and one or more USSs configured on the second cell for PDCCH including scheduling data for the first cell, and perform blind decoding of the one or more PDCCH candidates in at least one of the one or more CSSs or one or more USSs on the first cell and the one or more USSs on the second cell based on the configuration and within a scheduled cell limit including a total number of BDs and non-overlapping CCEs for PDCCH candidates.

In some aspects, the UE may report, to the base station, a parameter indicating PDCCH blind decoding capabilities supported by the UE for CA, and the base station may set the scheduled cell limit less than or equal to the PDCCH blind decoding capabilities supported by the UE indicated by the parameter. In one aspect, the scheduled cell limit may be based on a smaller or the same SCS associated with the first cell or the second cell. In another aspect, the scheduled cell limit has a value less than or equal to a CA limit of the first cell and the second cell.

The UE may receive the PDCCH in one or more of the PDCCH candidates, and receive a physical downlink shared channel (PDSCH) from the base station or transmitting a physical uplink shared channel (PUSCH) to the base station on the first cell based on the PDCCH. The UE may perform blind decoding of the one or more CSSs on the first cell and the one or more USSs on the first cell within the first threshold and the second threshold.

In some aspects, the first threshold indicating a first maximum number of BDs and a second threshold indicating a second maximum number of non-overlapping CCEs for the CSSs on the first cell may be based on a slot having a highest number of BDs and non-overlapping CCEs for the CSSs, a third maximum number of BDs for the USSs on the second cell may be based on the scheduled cell limit minus the first threshold, and a fourth maximum number of non-overlapping CCEs for the USSs on the second cell may be based on the scheduled cell limit minus the second threshold.

In one aspect, the configuration may further include the one or more PDCCH candidates in one or more USSs configured on the first cell, and where the method further including receiving, from the base station, an indication of a first threshold indicating a first maximum number of BDs and a second threshold indicating a second maximum number of non-overlapping CCEs for the PDCCH candidates on the first cell. The base station may transmit the first threshold and the second threshold via an RRC message.

In some aspect, a third threshold for a third maximum number BDs and a fourth threshold for a fourth maximum number of non-overlapping CCEs for the CSSs on the first cell may be based on a slot having a highest number of BDs and non-overlapping CCEs for the CSSs, and the first threshold may have a value greater than or equal to the third threshold and the second threshold has a value greater than or equal to the fourth threshold.

In one aspect, the base station may schedule at least one USS of the first USSs configured on the first cell beyond the first threshold or the second threshold of the first cell. The UE may determine that at least one USS of the first USSs configured on the first cell is scheduled beyond the first threshold and the second threshold and within the first threshold and the second threshold of the first cell, and determine not to monitor the PDCCH candidates for the at least one USS of the first USSs scheduled beyond the first threshold or the second threshold.

In some aspect, the UE may transmit an indication of support for the one or more USSs on the first cell, and the base station may receive the indication of the support for the one or more USSs on the first cell. The configuration for the one or more USSs on the first cell may be based on the UE supporting the one or more USSs on the first cell.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a UE, the method including receiving, from a base station, a configuration for one or more PDCCH candidates in at least one of one or more CSSs and one or more USSs configured on a first cell, or one or more CSSs configured on the first cell, and one or more USSs configured on a second cell, the configuration for PDCCH including scheduling data for the first cell, the first cell including at least one of a PCell or a PSCell, and the second cell including an SCell, and performing blind decoding of the one or more PDCCH candidates in at least one of the one or more CSSs or one or more USSs on the first cell and the one or more USSs on the second cell based on the configuration and within a scheduled cell limit including a first total number of BDs and a second total number of non-overlapping CCEs for PDCCH candidates.

Aspect 2 is the method of aspect 1, where the scheduled cell limit is based on a smaller or same SCS associated with the first cell or the second cell.

Aspect 3 is the method of any of aspects 1 and 2, further including reporting, to the base station, a parameter indicating PDCCH blind decoding capabilities supported by the UE for CA, where the scheduled cell limit is set less than or equal to the PDCCH blind decoding capabilities supported by the UE indicated by the parameter.

Aspect 4 is the method of any of aspects 1 to 3, where the scheduled cell limit has values less than or equal to a CA limit of the first cell and the second cell.

Aspect 5 is the method of any of aspects 1 to 4, further including receiving a PDCCH in one or more of the PDCCH candidates, and receiving a PDSCH from the base station or transmitting a PUSCH to the base station on the first cell based on the PDCCH.

Aspect 6 is the method of any of aspects 1 to 5, where a first threshold indicating a first maximum number of BDs and a second threshold indicating a second maximum number of non-overlapping CCEs for the CSSs on the first cell are based on a slot having a highest number of BDs and non-overlapping CCEs for the CSSs, a third maximum number of BDs for the USSs on the second cell is based on the scheduled cell limit of BDs minus the first threshold, and a fourth maximum number of non-overlapping CCEs for the USSs on the second cell is based on the scheduled cell limit of non-overlapping CCEs minus the second threshold.

Aspect 7 is the method of any of aspects 1 to 6, where the configuration further includes the one or more PDCCH candidates in one or more USSs configured on the first cell, and where the method further including receiving, from the base station, an indication of a first threshold indicating a first maximum number of BDs and a second threshold indicating a second maximum number of non-overlapping CCEs for the PDCCH candidates on the first cell.

Aspect 8 is the method of aspect 7, where the first threshold and the second threshold are received via an RRC message.

Aspect 9 is the method of any of aspects 7 and 8, further including performing blind decoding of the one or more CSSs on the first cell and the one or more USSs on the first cell within the first threshold and the second threshold.

Aspect 10 is the method of aspect 9, where a third threshold for a third maximum number BDs and a fourth threshold for a fourth maximum number of non-overlapping CCEs for the CSSs on the first cell is based on a slot having a highest number of BDs and non-overlapping CCEs for the CSSs, and the first threshold has a value greater than or equal to the third threshold and the second threshold has a value greater than or equal to the fourth threshold.

Aspect 11 is the method of any of aspects 7 to 10, further including determining that at least one USS of the first USSs configured on the first cell is scheduled beyond the first threshold or the second threshold of the first cell, and determining not to monitor the PDCCH candidates for the at least one USS of the first USSs scheduled beyond the first threshold and the second threshold.

Aspect 12 is the method of any of aspects 7 to 11, further including transmitting an indication of support for the one or more USSs on the first cell, where the configuration for the one or more USS s on the first cell is based on the UE supporting the one or more USSs on the first cell.

Aspect 13 is an apparatus for wireless communication including at least one processor coupled to a memory and configured to implement a method as in any of aspects 1 to 12, further including a transceiver coupled to the at least one processor.

Aspect 14 is an apparatus for wireless communication including means for implementing a method as in any of aspects 1 to 12.

Aspect 15 is a computer-readable medium storing computer executable code, where the code when executed by a processor causes the processor to implement a method as in any of aspects 1 to 12.

Aspect 16 is a method of wireless communication at a network node, the method including configuring a first threshold indicating a first maximum number of BDs and a second threshold indicating a second maximum number of non-overlapping CCEs for PDCCH candidates on a first cell, outputting for transmission, for a UE, a configuration for one or more PDCCH candidates in at least one of one or more CSSs and one or more USSs configured on the first cell or one or more CSSs configured on the first cell, and one or more USSs configured on a second cell, the configuration for PDCCH including scheduling data for the first cell, the first cell including at least one of a PCell or a PSCell, and the second cell including an SCell, and outputting for transmission, for the UE, at least one PDCCH in the one or more PDCCH candidates in at least one of one or more CSSs or one or more USSs configured on the first cell and the one or more USSs configured on the second cell for PDCCH including scheduling of the first cell based on the configuration and within a scheduled cell limit including a first total number of BDs and a second total number of non-overlapping CCEs for the PDCCH candidates.

Aspect 17 is the method of aspect 16, where the scheduled cell limit including a first total number of BDs and a second total number of non-overlapping CCEs for PDCCH candidates is based on a smaller or the same SCS associated with the first cell or the second cell.

Aspect 18 is the method of any of aspects 16 and 17, where the scheduled cell limit has values less than or equal to a CA limit of the first cell and the second cell.

Aspect 19 is the method of any of aspects 16 to 18, further including receiving, from the UE, a parameter indicating PDCCH blind decoding capabilities supported by the UE for CA, where the scheduled cell limit is set less than or equal to the PDCCH blind decoding capabilities supported by the UE indicated by the parameter.

Aspect 20 is the method of any of aspects 16 to 19, further including outputting for transmission a PDSCH or receiving a PUSCH from the UE on the first cell based on the PDCCH.

Aspect 21 is the method of any of aspects 16 to 20, where the first threshold indicates a first maximum number of BDs and a second maximum number of non-overlapping CCEs for the CSSs on the first cell are based on a slot having a highest number of BDs and non-overlapping CCEs for the CSSs, and a third maximum number of BDs for the USSs on the second cell is based on the scheduled cell limit of BDs minus the first threshold, and a fourth maximum number of non-overlapping CCEs for the USSs on the second cell is based on the scheduled cell limit of non-overlapping CCEs minus second threshold.

Aspect 22 is the method of any of aspects 16 to 21, where the configuration further includes the one or more PDCCH candidates in the one or more USSs on the first cell, where the method further including outputting for transmission an indication of a first threshold indicating a first maximum number of BDs and a second threshold indicating a second maximum number of non-overlapping CCEs for the PDCCH candidates on the first cell.

Aspect 23 is the method of aspect 22, where the first threshold is transmitted via an RRC message.

Aspect 24 is the method of any of aspects 22 and 23, where a third threshold for a third maximum number BDs and a fourth threshold for a fourth maximum number of non-overlapping CCEs for the CSSs on the first cell is based on a slot having a highest number of BDs and non-overlapping CCEs for the CSSs, and the first threshold has a value greater than or equal to the third threshold and the second threshold has a value greater than or equal to the fourth threshold.

Aspect 25 is the method of aspect 22, where at least one of the first USSs configured on the first cell is scheduled beyond the second threshold or the first threshold of the first cell.

Aspect 26 is the method of any of aspects 22 to 25, further including receiving an indication of support for the one or more USSs on the first cell, where the configuration for the one or more USS s on the first cell is based on the UE supporting the one or more USSs on the first cell.

Aspect 27 is an apparatus for wireless communication including at least one processor coupled to a memory and configured to implement a method as in any of aspects 16 to 26, further including a transceiver coupled to the at least one processor.

Aspect 28 is an apparatus for wireless communication including means for implementing a method as in any of aspects 16 to 26.

Aspect 29 is a computer-readable medium storing computer executable code, where the code when executed by a processor causes the processor to implement a method as in any of aspects 16 to 26.

What is claimed is:

1. An apparatus for wireless communication at a user equipment (UE), comprising:
    a memory; and
    at least one processor coupled to the memory and configured to:
        receive, from a base station, a configuration for one or more physical downlink control channel (PDCCH) candidates in:
            at least one of one or more common search spaces (CSSs) and one or more user-specific search spaces (USSs) configured on a first cell, or
            one or more CSSs configured on the first cell, and one or more USSs configured on a second cell, the configuration for PDCCH including scheduling data for the first cell, the first cell including at least one of a primary cell (PCell) or a primary secondary cell (PSCell), and the second cell including a secondary cell (SCell); and
        perform blind decoding of the one or more PDCCH candidates in at least one of the one or more CSSs or one or more USSs on the first cell and the one or more USSs on the second cell based on the configuration and within a scheduled cell limit including a first total number of blind decodes (BDs) and a second total number of non-overlapping control channel elements (CCEs) for PDCCH candidates.

2. The apparatus of claim 1, further comprising a transceiver coupled to the at least one processor, wherein the scheduled cell limit is based on a smaller or same subcarrier spacing (SCS) associated with the first cell or the second cell.

3. The apparatus of claim 1, wherein the at least one processor is further configured to report, to the base station, a parameter indicating PDCCH blind decoding capabilities supported by the UE for carrier aggregation (CA),
    wherein the scheduled cell limit is set less than or equal to the PDCCH blind decoding capabilities supported by the UE indicated by the parameter.

4. The apparatus of claim 1, wherein the scheduled cell limit has values less than or equal to a CA limit of the first cell and the second cell.

5. The apparatus of claim 1, wherein the at least one processor is further configured to:
    receive the PDCCH in one or more of the PDCCH candidates; and
    receive a physical downlink shared channel (PDSCH) from the base station or transmitting a physical uplink shared channel (PUSCH) to the base station on the first cell based on the PDCCH.

6. The apparatus of claim 1, wherein a first threshold indicating a first maximum number of BDs and a second threshold indicating a second maximum number of non-overlapping CCEs for the CSSs on the first cell are based on a slot having a highest number of BDs and non-overlapping CCEs for the CSSs, and
    wherein a third maximum number of BDs for the USSs on the second cell is based on the scheduled cell limit of BDs minus the first threshold, and a fourth maximum number of non-overlapping CCEs for the USSs on the second cell is based on the scheduled cell limit of the non-overlapping CCEs minus the second threshold.

7. The apparatus of claim 1, wherein the configuration further includes the one or more PDCCH candidates in the one or more USSs configured on the first cell, and
    wherein the at least one processor is further configured to receive, from the base station, an indication of a first threshold indicating a first maximum number of BDs and a second threshold indicating a second maximum number of non-overlapping CCEs for the PDCCH candidates on the first cell.

8. The apparatus of claim 7, wherein at least one of the first threshold or the second threshold are received via a radio resource control (RRC) message.

9. The apparatus of claim 7, wherein the at least one processor is further configured to: perform the blind decoding of the one or more CSSs on the first cell and the one or more USSs on the first cell within the first threshold and the second threshold.

10. The apparatus of claim 9, wherein a third threshold for a third maximum number BDs and a fourth threshold for a fourth maximum number of non-overlapping CCEs for the CSSs on the first cell is based on a slot having a highest number of BDs and non-overlapping CCEs for the CSSs, and the first threshold has a first value greater than or equal to the third threshold and the second threshold has a second value greater than or equal to the fourth threshold.

11. The apparatus of claim 7, wherein the at least one processor is further configured to:
 determine that at least one USS of the first USSs configured on the first cell is scheduled beyond the first threshold or the second threshold of the first cell; and
 determine not to monitor the PDCCH candidates for the at least one USS of the first USSs scheduled beyond the first threshold or the second threshold.

12. The apparatus of claim 7, wherein the at least one processor is further configured to indicate support for the one or more USSs on the first cell, wherein the configuration for the one or more USSs on the first cell is based on the UE supporting the one or more USSs on the first cell.

13. An apparatus for wireless communication at a network node, comprising:
 a memory; and
 at least one processor coupled to the memory and configured to:
  configure a first threshold indicating a first maximum number of blind decodes (BDs) and a second threshold indicating a second maximum number of non-overlapping control channel elements (CCEs) for physical downlink control channel (PDCCH) candidates on a first cell;
  output for transmission, for a user equipment (UE), a configuration for one or more PDCCH candidates in at least one of one or more common search spaces (CSSs) and one or more user-specific search spaces (USSs) configured on the first cell or one or more CSSs configured on the first cell, and one or more USSs configured on a second cell, the configuration for PDCCH including scheduling data for the first cell, the first cell including at least one of a primary cell (PCell) or a primary secondary cell (PSCell), and the second cell including a secondary cell (SCell); and
  output for transmission, for the UE, at least one PDCCH in the one or more PDCCH candidates in at least one of one or more CSSs or the one or more USSs configured on the first cell and the one or more USSs configured on the second cell for the PDCCH including scheduling of the first cell based on the configuration and within a scheduled cell limit including a total number of BDs and non-overlapping CCEs for the PDCCH candidates.

14. The apparatus of claim 13, further comprising a transceiver coupled to the at least one processor, wherein the scheduled cell limit including the total number of BDs and the non-overlapping CCEs for PDCCH candidates is based on a smaller or same subcarrier spacing (SCS) associated with the first cell or the second cell.

15. The apparatus of claim 13, wherein the scheduled cell limit has a value less than or equal to a CA limit of the first cell and the second cell.

16. The apparatus of claim 13, wherein the at least one processor is further configured to receive, from the UE, a parameter indicating PDCCH blind decoding capabilities supported by the UE for carrier aggregation (CA),
 wherein the scheduled cell limit is set less than or equal to the PDCCH blind decoding capabilities supported by the UE indicated by the parameter.

17. The apparatus of claim 13, wherein the at least one processor is further configured to output for transmission a physical downlink shared channel (PDSCH) or receiving a physical uplink shared channel (PUSCH) from the UE on the first cell based on the PDCCH.

18. The apparatus of claim 13, wherein the first threshold indicates a first maximum number of BDs and a second maximum number of non-overlapping CCEs for the CSSs on the first cell are based on a slot having a highest number of BDs and the non-overlapping CCEs for the CSSs, and a third maximum number of BDs for the USSs on the second cell is based on the scheduled cell limit of BDs minus the first threshold, and a fourth maximum number of non-overlapping CCEs for the USSs on the second cell is based on the scheduled cell limit of the non-overlapping CCEs minus the second threshold.

19. The apparatus of claim 13, wherein the configuration further includes the one or more PDCCH candidates in the one or more USSs on the first cell, and the at least one processor is further configured to output for transmission an indication of the first threshold indicating a first maximum number of BDs and the second threshold indicating a second maximum number of non-overlapping CCEs for the PDCCH candidates on the first cell.

20. The apparatus of claim 19, wherein at least one of the first threshold or the second threshold is transmitted via a radio resource control (RRC) message.

21. The apparatus of claim 19, wherein a third threshold for a third maximum number BDs and a fourth threshold for a fourth maximum number of non-overlapping CCEs for the CSSs on the first cell is based on a slot having a highest number of BDs and the non-overlapping CCEs for the CSSs, and the first threshold has a first value greater than or equal to the third threshold and the second threshold has a second value greater than or equal to the fourth threshold.

22. The apparatus of claim 19, wherein at least one of the first USSs configured on the first cell is scheduled beyond the second threshold or the first threshold of the first cell.

23. The apparatus of claim 19, wherein the at least one processor is further configured to receive an indication of support for the one or more USSs on the first cell, wherein the configuration for the one or more USSs on the first cell is based on the UE supporting the one or more USSs on the first cell.

24. A method of wireless communication at a user equipment (UE), comprising:
 receiving, from a base station, a configuration for one or more physical downlink control channel (PDCCH) candidates in at least one of one or more common search spaces (CSSs) and one or more user-specific search spaces (USSs) configured on a first cell or one or more CSSs configured on the first cell, and one or more USSs configured on a second cell, the configuration for PDCCH including scheduling data for the first cell, the first cell including at least one of a primary cell (PCell) or a primary secondary cell (PSCell), and the second cell including a secondary cell (SCell); and performing blind decoding of the one or more PDCCH candidates in at least one of the one or more CSSs or one or more USSs on the first cell and the one or more USSs on the second cell based on the configuration and within a scheduled cell limit including a first total number of blind decodes (BDs) and a second total number of non-overlapping control channel elements (CCEs) for PDCCH candidates.

25. The method of claim 24, wherein the configuration further includes the one or more PDCCH candidates in one or more USSs configured on the first cell, and
wherein the method further comprises receiving, from the base station, an indication of a first threshold indicating a first maximum number of BDs and a second threshold indicating a second maximum number of non-overlapping CCEs for the PDCCH candidates on the first cell.

26. The method of claim 25, further comprising:
performing blind decoding of the one or more CSSs on the first cell and the one or more USSs on the first cell within the first threshold and the second threshold,
wherein a third threshold for a third maximum number BDs and a fourth threshold for a fourth maximum number of non-overlapping CCEs for the CSSs on the first cell is based on a slot having a highest number of BDs and non-overlapping CCEs for the CSSs, and the first threshold has a first value greater than or equal to the third threshold and the second threshold has a second value greater than or equal to the fourth threshold.

27. The method of claim 25, further comprising:
determining that at least one USS of the first USSs configured on the first cell is scheduled beyond the first threshold or the second threshold of the first cell; and
determining not to monitor the PDCCH candidates for the at least one USS of the first USSs scheduled beyond the first threshold or the second threshold.

28. A method of wireless communication at a network node, comprising:
configuring a first threshold indicating a first maximum number of blind decodes (BDs) and a second threshold indicating a second maximum number of non-overlapping control channel elements (CCEs) for physical downlink control channel (PDCCH) candidates on a first cell;
outputting for transmission, for a user equipment (UE), a configuration for one or more PDCCH candidates in at least one of one or more common search spaces (CSSs) and one or more user-specific search spaces (USSs) configured on the first cell or one or more CSSs configured on the first cell, and one or more USSs configured on a second cell, the configuration for PDCCH including scheduling data for the first cell, the first cell including at least one of a primary cell (PCell) or a primary secondary cell (PSCell), and the second cell including a secondary cell (SCell); and
outputting for transmission, for the UE, at least one PDCCH in at least one of the one or more PDCCH candidates in at least one of the one or more CSSs or the one or more USSs configured on the first cell and the one or more USSs configured on the second cell for the PDCCH including scheduling of the first cell based on the configuration and within a scheduled cell limit including a total number of BDs and non-overlapping CCEs for the PDCCH candidates.

29. The method of claim 28, wherein the scheduled cell limit including the total number of BDs and the non-overlapping CCEs for PDCCH candidates is based on a smaller or same subcarrier spacing (SCS) associated with the first cell or the second cell.

30. The method of claim 28, wherein the configuration further includes the one or more PDCCH candidates in the one or more USSs on the first cell, wherein the method further comprises outputting for transmission an indication of the first threshold indicating a first maximum number of BDs and the second threshold indicating a second maximum number of non-overlapping CCEs for the PDCCH candidates on the first cell.

* * * * *